US009043392B2

(12) United States Patent
Imai et al.

(10) Patent No.: US 9,043,392 B2
(45) Date of Patent: May 26, 2015

(54) SCREEN DATA TRANSFER DEVICE AND A PROCESSING LOAD REDUCTION METHOD

(71) Applicant: FUJITSU LIMITED, Kawasaki-shi, Kanagawa (JP)

(72) Inventors: Tomoharu Imai, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/195,950

(22) Filed: Mar. 4, 2014

(65) Prior Publication Data
US 2014/0310336 A1 Oct. 16, 2014

(30) Foreign Application Priority Data

Apr. 11, 2013 (JP) .................................. 2013-083214

(51) Int. Cl.
H04N 13/04 (2006.01)
G09G 5/00 (2006.01)
H04L 29/06 (2006.01)

(52) U.S. Cl.
CPC ................ G09G 5/006 (2013.01); H04L 67/38 (2013.01); G09G 2340/02 (2013.01); G09G 2350/00 (2013.01); G09G 2370/022 (2013.01)

(58) Field of Classification Search
CPC ..................................................... H04L 67/42
USPC ........... 709/203, 217, 219; 382/232, 239, 100
See application file for complete search history.

(56) References Cited

U.S. PATENT DOCUMENTS

| 7,620,870 B2 * | 11/2009 | Srinivasan et al. ............ 714/748 |
| 2001/0055285 A1 | 12/2001 | Tomoike |
| 2011/0216982 A1 * | 9/2011 | Ho et al. ....................... 382/238 |
| 2012/0131092 A1 * | 5/2012 | Kawamura et al. ........... 709/203 |

FOREIGN PATENT DOCUMENTS

| JP | 2002-007238 | 1/2002 |
| JP | 2003-167745 | 6/2003 |
| JP | 2011-238014 | 11/2011 |

OTHER PUBLICATIONS

"A New Algorithm for Data Compression Optimization"—IJACSA, vol. 3, No. 8, Nov. 2012 http://arxiv.org/ftp/arxiv/papers/1209/1209.1045.pdf.*

* cited by examiner

Primary Examiner — Randy Scott
(74) Attorney, Agent, or Firm — Fujitsu Patent Center

(57) ABSTRACT

A screen data transfer device that includes a processor that executes a procedure. The procedure includes: (a) receiving screen data having a changed portion compressed by first compression processing, and detecting a high region where a changed frequency in the screen is a threshold value or greater; (b) detecting a processing load of the device itself; and (c) when the detected load is a threshold value or greater, and in cases in which the changed portion overlaps with the high region, assigning a route of the screen data to a first route in which second compression processing with a higher compression ratio than the first compression processing is executed by a compression section, and in cases in which the changed portion does not overlap with the high region, assigning the route to a second route in which the screen data bypasses the compression section.

20 Claims, 25 Drawing Sheets

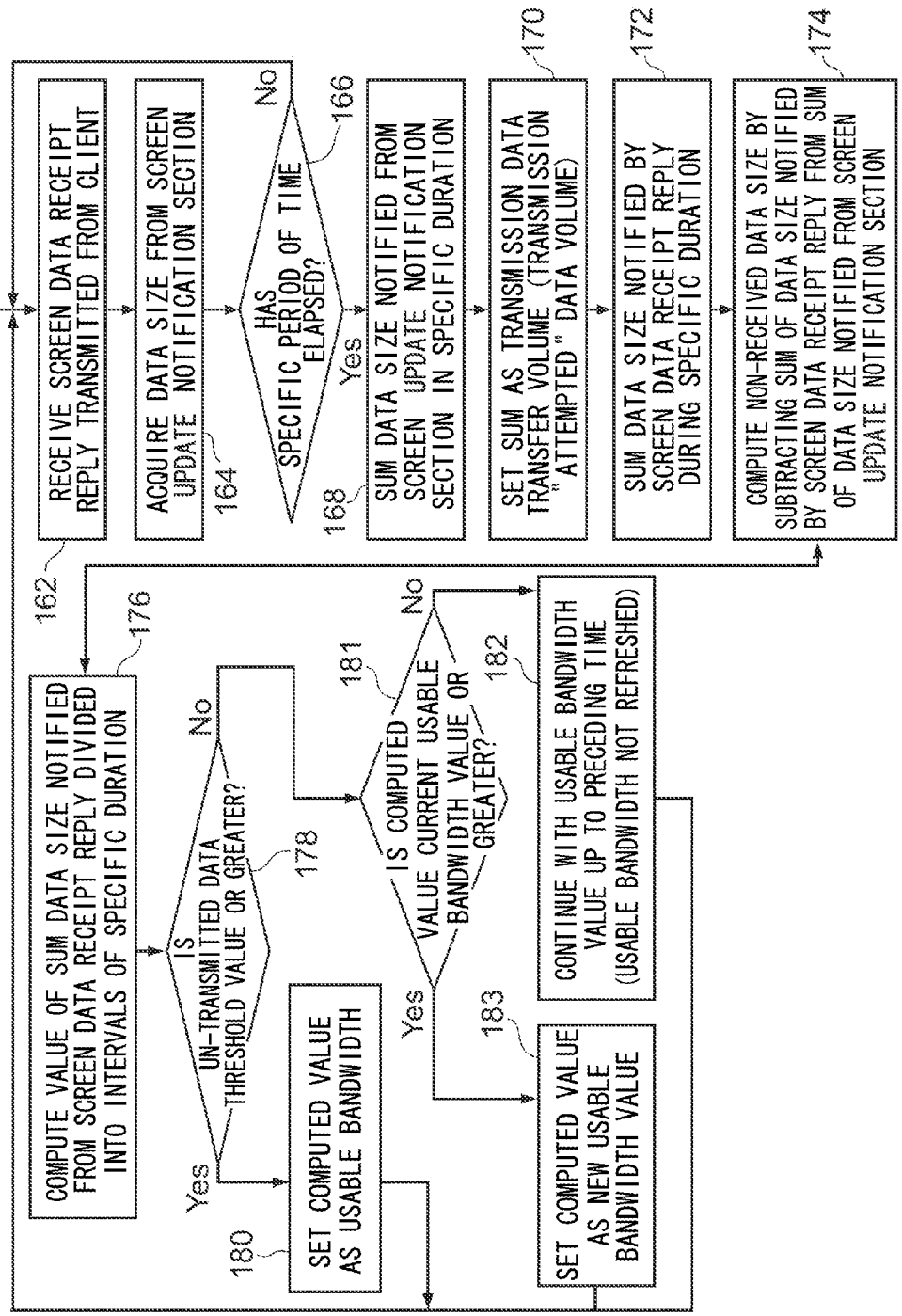

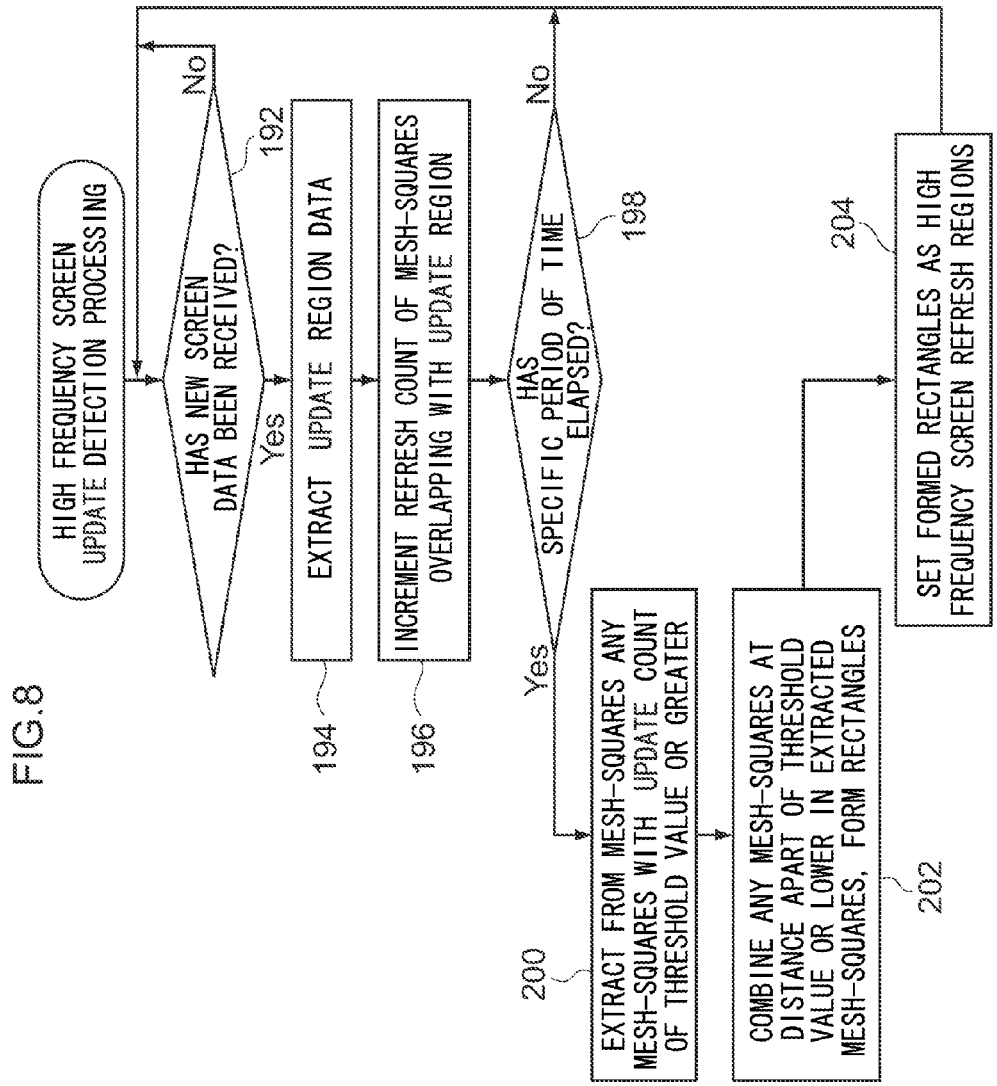

RECEIVE SCREEN DATA FROM SERVER

COMPRESSION TYPE (A) NOT NON-PROCESSING SESSION ········ HIGH COMPRESSION PROCESSING (GW)

(B) NON-PROCESSING SESSION, LOAD NOT LARGE (a) G1 IS WITHIN Rw ····· HIGH COMPRESSION PROCESSING (GW)

(b) G2 IS OUTSIDE Rw ····· LOW COMPRESSION PROCESSING (S)

(C) NON-PROCESSING SESSION, LARGE LOAD

G1 IS OUTSIDE NRw ····· LOW COMPRESSION PROCESSING (S)

FIG.22

THRESHOLD VALUE SETTING TABLE                          420

| USABLE BANDWIDTH | DRAWING COMMAND COMPRESSION RATIO THRESHOLD VALUE |
|---|---|
| UP TO 1 Mbps | 30 % |
| 1 Mbps to 2 Mbps | 40 % |
| 2 Mbps to 5 Mbps | 50 % |
| 5 Mbps AND ABOVE | 60 % |

SCREEN DATA TRANSFER DEVICE AND A PROCESSING LOAD REDUCTION METHOD

CROSS-REFERENCE TO RELATED APPLICATION

This application is based upon and claims the benefit of priority of the prior Japanese Patent Application No. 2013-083214, filed on Apr. 11, 2013, the entire contents of which are incorporated herein by reference.

FIELD

The embodiments discussed herein are related to a screen data transfer device and a processing load reduction method.

BACKGROUND

Systems known as thin client systems are known. In the thin client system, only minimum functionality is given to a client, and the system is configured to manage resources such as applications and files on a server.

In practice, even while the thin client system makes the client display processing results from processing actually executed by the server and data actually saved on the server, configuration is made such that it appears that the client is the main executer of processing and holder of data.

Conversion gateways exist that convert old remote screen control protocols to new remote screen control protocols with superior functionality. Thin client systems also exist that have conversion gateways located between the client and server. In these cases, the conversion gateway receives the screen data from the server by the old remote screen control protocol, converts the screen data to the new remote screen control protocol, and transfers this data to the client.

As illustrated in FIG. 24, conversion gateway 506 may be in communication with plural clients 502A1, 502A2 and so on. In such cases, the conversion gateway 506 performs intermediate processing of processing (sessions) requested from each client 502A1, etc. The conversion gateway 506 performs the conversion processing to the new remote screen control protocol for each session. Specifically, "screen acquisition", "screen drawing", "compression" and "transfer" are performed. In more detail, during "screen acquisition", data including screen data is acquired from the server. During "screen drawing", the acquired screen data is decompressed and drawn to the frame buffer as bitmap data. During "compression", isolation and compression is performed on regions of data in frame buffer that need be transmitted. During "transfer", transfer of the compressed data is performed.

RELATED PATENT DOCUMENTS

Patent Document 1: Japanese Patent Application Laid-Open (JP-A) No. 2003-167745
Patent Document 2: JP-A No. 2002-007238
Patent Document 3: U.S. Patent Application Publication No. 2001-0055285

SUMMARY

According to an aspect of the embodiments, a screen data transfer device comprising:
a processor; and
a memory storing instructions, which when executed by the processor perform a procedure, the procedure including:

(a) receiving screen data that contains position data indicating a position to display on a screen and in which portions that have changed within the screen as a whole have been compressed by first compression processing, and, based on the position data of a plurality of the screen data received within a specific duration by a communication section that transmits screen data, detecting a high frequency screen update region where a changed frequency in the screen is a frequency threshold value or greater;
(b) detecting a processing load of the screen data transfer device itself; and (c) in cases in which the processing load detected in (b) is a load threshold value or greater, and based on the position data of the screen data received after the specific duration, the changed portion in the screen data overlaps with the high frequency screen update region, assigning a processing route for the screen data to a first route in which second compression processing with a higher compression ratio to that of the first compression processing is executed by a compression section and the screen data on which the second compression processing has been executed is transmitted by the communication section, and in cases in which the processing load detected in (b) is a load threshold value or greater, and based on the position data of the screen data received after the specific duration, the changed portion in the screen data does not overlap with the high frequency screen update region, assigning the processing route for the screen data to a second route in which the screen data bypasses the compression section and is transmitted by the communication section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flow chart illustrating usable bandwidth estimation processing executed by a usable bandwidth estimation section 108 of the first exemplary embodiment.

FIG. 8 is a flow chart illustrating high frequency screen update detection processing executed by a high frequency screen update region detection section 110 of the first exemplary embodiment.

FIG. 9A illustrates timings for transmitting screen data from a server, and also illustrates positions on a screen of each screen data, FIG. 9B illustrates a screen divided into plural regions (mesh-squares), FIG. 9C illustrates a histogram of update times for each of the mesh-squares, FIG. 9D illustrates extracted high frequency screen update regions, and FIG. 9E illustrates rectangular region setting from the extracted high frequency screen update regions.

FIG. 11A illustrates a high frequency screen update region prior to contraction, FIG. 11B illustrates a histogram of update times for each of the mesh-squares inside the high frequency screen update region, and FIG. 11C illustrates a contracted high frequency screen update region.

FIG. 22 is a diagram illustrating a threshold value setting table stored with threshold values of drawing command compression ratios corresponding to usable bandwidths of the third exemplary embodiment.

DESCRIPTION OF EMBODIMENTS

Detailed explanation follows regarding an example of an exemplary embodiment of technology disclosed herein, with reference to the drawings.

First Exemplary Embodiment

Figure 1:
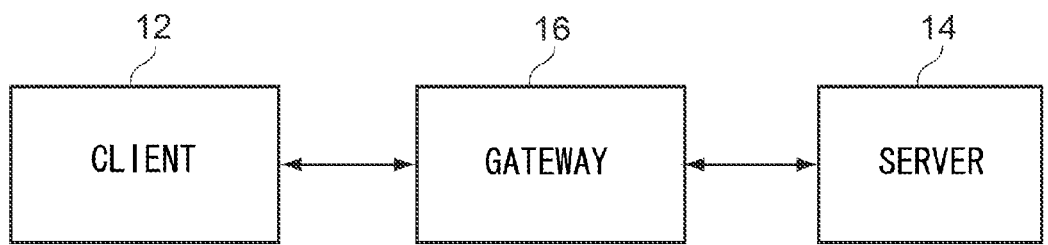
FIG. 1 is a diagram illustrating a configuration of a thin client system of a first exemplary embodiment.

Explanation follows regarding configuration of the first exemplary embodiment. As illustrated in FIG. 1, a thin client system of the first exemplary embodiment includes a client terminal (referred to below as client) 12, and a server apparatus (referred to below as server) 14. In the first exemplary embodiment a conversion gateway server (referred to below as gateway) 16 is installed between the client 12 and the server 14. Only a single client 12 and a single server 14 are illustrated in FIG. 1, however plural of each may be provided.

Note that the client 12, the server 14, and the gateway 16 respectively correspond to a screen display terminal, a screen data transmission device, and a screen data transfer device of technology disclosed herein, and the thin client system corresponds to a screen display system of technology disclosed herein.

The thin client system of the first exemplary embodiment is one in which a screen displayed on the client 12 is remotely controlled by the server 14. Namely, in the thin client system, even though it is actually the results of processing executed by the server 14 and data held by the server 14 that is displayed on the client 12, configuration is made such that it appears that the client 12 is the main executer of processing and holder of data.

The server 14 is a computer providing a service that remotely controls screen display on the client 12. A remote screen control application for servers is installed or preinstalled in the server 14.

The client 12 is a computer on the receiving end of the provision of remote screen control service by the server 14. Examples of the client 12 include fixed terminals such as a personal computer, and mobile terminals such as a mobile telephone, a Personal Handyphone System (PHS) or a Personal Digital Assistant (PDA). A remote screen control application for clients is installed or preinstalled in the client 12. Each user employs the client 12 to utilize a desktop environment on the server 14. In the first exemplary embodiment, the size of the desktop screen on the server 14 and the size of the screen held by the client 12 are the same as each other. The server 14 and the client 12 may employ any application on the display screen of a display device. Configuration may be made such that by utilizing the client 12, each respective user does not access the gateway 16 through the same access line, but access the gateway 16 through access lines of different performance to each other.

The client 12 and the server 14 communicate with each other through the gateway 16. The gateway 16 converts with a remote screen control protocol between the server 14 and the client 12, and transmits data to the other side.

Figure 2:
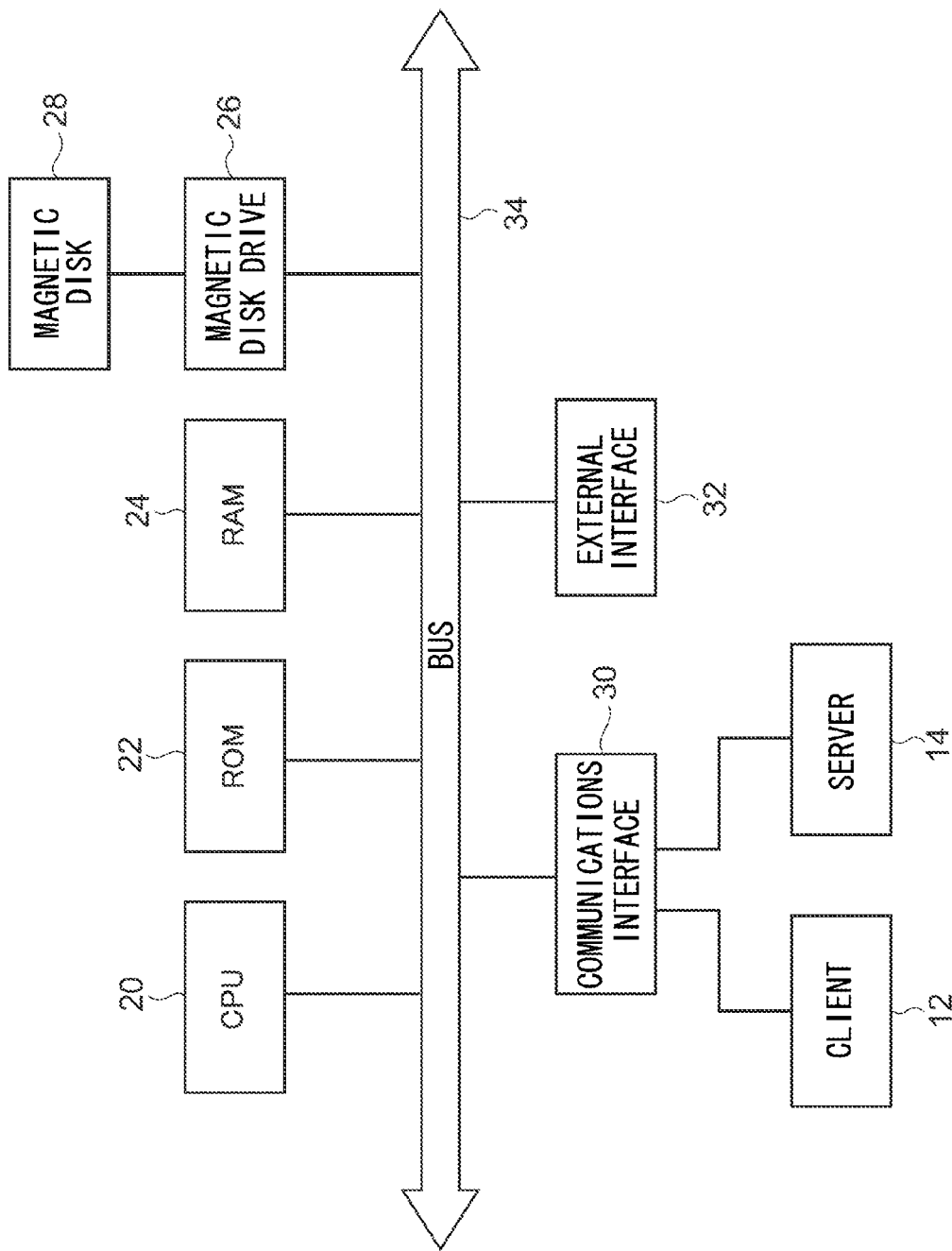
FIG. 2 is a block diagram illustrating a hardware configuration of a gateway 16.

As illustrated in FIG. 2, the gateway 16 includes a Central Processing Unit (CPU) 20, Read Only Memory (ROM) 22, and Random Access Memory (RAM) 24, that are connected to each other through a bus 34. A magnetic disk drive 26, a communications interface 30, and an external interface 32 are also connected to the bus 34. Note that a magnetic disk 28 is installed in the magnetic disk drive 26. The client 12 and the server 14 are connected to the communications interface 30.

The server 14 is configured similarly to the gateway 16, and so further explanation is omitted. The client 12 is also of a substantially similar configuration to that of the gateway 16, however the client 12 is further provided with an input section and a display section, not illustrated in the drawings, connected to the bus 34.

Note that the input section of the client 12 is an input device that receives various information, such as for example instruction input for each section of the client 12, described later, and for example a keyboard or mouse may be appropriately applied therefor.

The display section of the client 12 is a display device that displays various information, such as for example desktop screens transmitted from the server 14, through the gateway 16. As examples, a monitor, display and touch panel may be appropriately applied therefor. Note that the display section also implements a pointing device function, in cooperation with the mouse.

Communication between the client 12 and the gateway 16, and between the server 14 and the gateway 16 may be wired or wireless, and various communication networks may be employed therefor, such as Internet, a Local Area Network (LAN), or a Virtual Private Network (VPN). Note that the server 14 employs an old remote screen control protocol as the protocol for transmission of screen data, however the gateway 16 employs a new remote screen control protocol as a protocol for screen data transfer.

Figure 3:
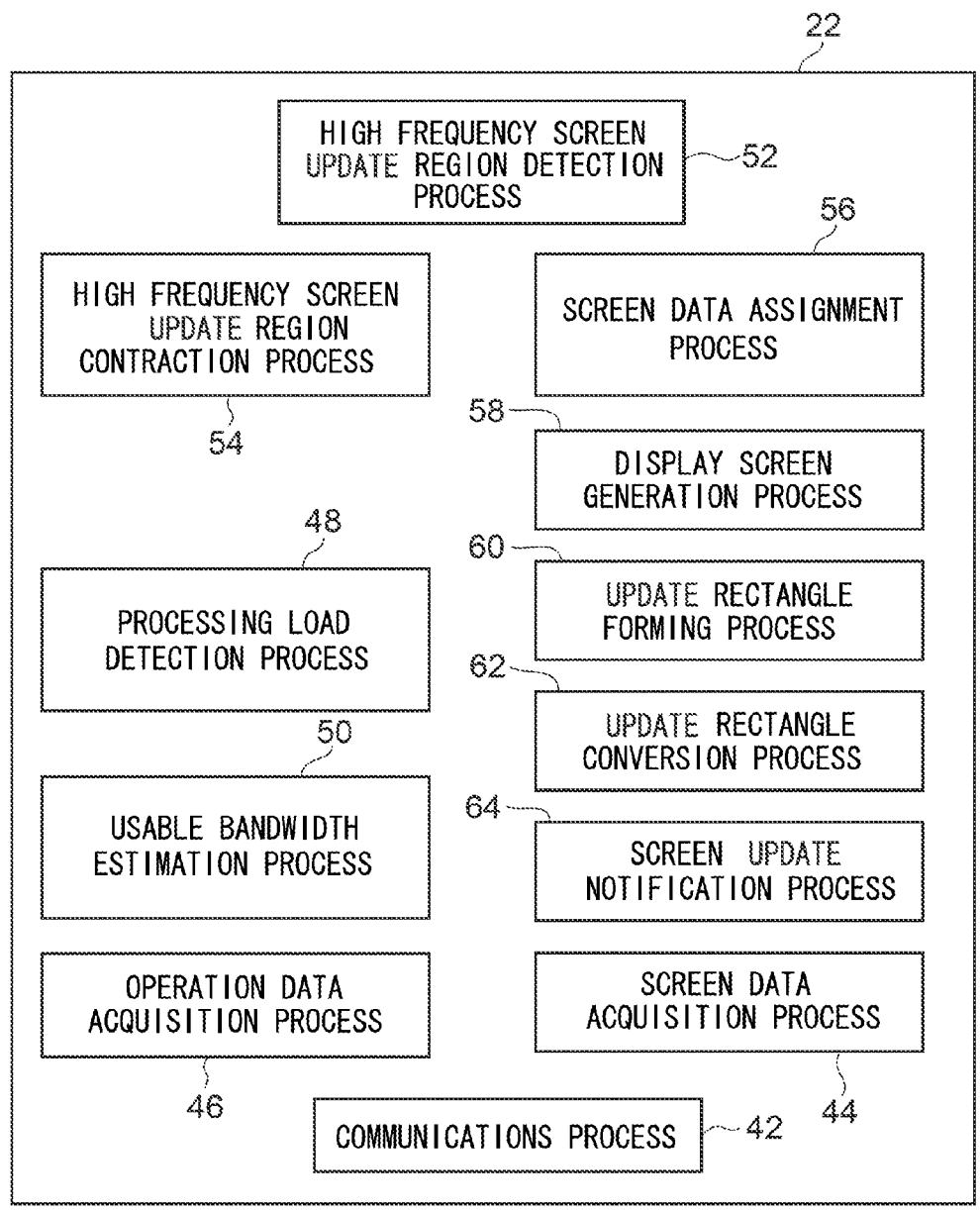
FIG. 3 is a diagram illustrating a configuration of a screen data transmission program stored in ROM 22 of the gateway 16 of the first exemplary embodiment.

A screen data transfer program as illustrated in FIG. 3 is stored in the ROM 22 of the gateway 16. The CPU 20 reads the screen data transfer program from the ROM 22, expands the screen data transfer program into the RAM 24, and executes processes of the screen data transfer program. The screen data transfer program includes a communications process 42, a screen data acquisition process 44, and an operation data acquisition process 46. The screen data transfer program includes a processing load detection process 48, a usable bandwidth estimation process 50, a high frequency screen update region detection process 52, a high frequency screen update region contraction process 54, and a screen data assignment process 56. The screen data transfer program also includes a display screen generation process 58, a update rectangle forming process 60, a update rectangle conversion process 62, and a screen update notification process 64.

Note that an example is given here of a case in which the screen data transfer program is read from the ROM 22, however the screen data transfer program is not stored on the ROM 22 initially. For example, the screen data transfer program may initially be stored on any portable storage medium employed by connection to the gateway 16, such as a Solid State Drive (SSD), a DVD disk, an IC card, a magneto-optical disk, or a CD-ROM. The gateway 16 may also acquire and execute the screen data transfer program from such portable storage media. The screen data transfer program may also be stored on a storage section of another computer or server device connected to the gateway 16 through a communication line. In such cases, the gateway 16 acquires and executes the screen data transfer program from the other computer or server device.

Figure 4:
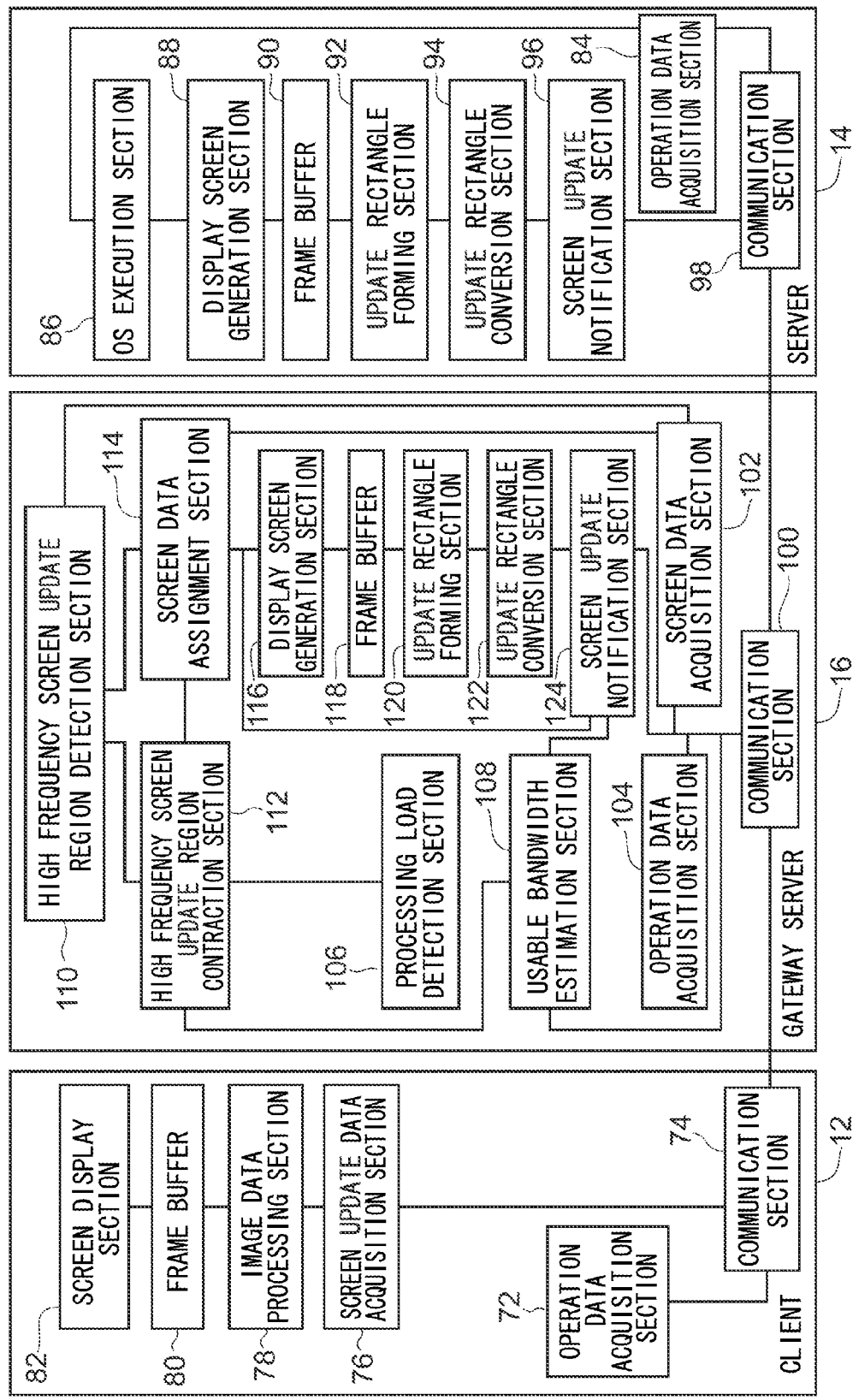
FIG. 4 is a functional block diagram of a thin client system of the first exemplary embodiment.

FIG. 4 illustrates a functional block diagram of a thin client system of the first exemplary embodiment. The client 12 includes an operation data acquisition section 72, a communication section 74, a screen update data acquisition section 76, an image data processing section 78, a frame buffer 80, and a screen display section 82.

The operation data acquisition section 72 receives operation data input through an input section, not illustrated in the drawings. Examples of operation data include operations beginning with a left or right click of a mouse, such as a double-click, or drag, or movement amount data of a mouse cursor acquired through a mouse movement operation. Other examples include a rotation amount of a mouse wheel, or identifiers of keys pressed on a keyboard.

The communication section 74 transmits operation data to the server 14 and receives data from the gateway 16. The screen update data acquisition section 76 acquires the screen data received from the gateway 16 through the communication section 74, and performs processing to render the acquired screen data drawable. The screen data processing section 78 performs drawing processing on the acquired screen data. The frame buffer 80 writes data of the results of drawing processing. The screen display section 82 displays the data of the frame buffer 80 on a display section, not illustrated in the drawings.

The server 14 includes an operation data acquisition section 84, an OS execution section 86, a display screen generation section 88, a frame buffer 90, a update rectangle forming section 92, a update rectangle conversion section 94, a screen update notification section 96, and a communication section 98.

The communication section 98 performs transmission and reception of data to and from the gateway 16.

The operation data acquisition section 84 acquires the above operation data received from the gateway 16 through the communication section 98. The OS execution section 86 executes an Operating System (OS) in the server 14. For example, the OS execution section 86 detects application launch instructions and commands to applications from operation data acquired by the operation data acquisition section 84. For example, when the OS execution section 86 has detected a double-click over an icon of an application, the OS execution section 86 launches the application corresponding to that icon. As another example, when on operation requesting execution of a command in an operation screen of a launched application, referred to as a window, has been detected, the OS execution section 86 executes that command.

The display screen generation section 88 performs screen update according to execution of the OS execution section 86. For example, a display image of results from processing executed by the OS execution section 86 is drawn in the frame buffer 90. The frame buffer 90 is a storage device that is written with the screen that is updated and stores bit map data of the updated screen. The update rectangle forming section 92 periodically checks the frame buffer 90, and generates a changed region as a update rectangle. Namely, the update rectangle forming section 92 compares the desktop screen being displayed on the client 12 during previous frame generation with a desktop screen written to the frame buffer 90 during current frame generation. Then the update rectangle forming section 92 creates an image of a update rectangle formed in a rectangle so as to join together the pixels of the portions changed from the previous frame. The update rectangle conversion section 94 compresses the update rectangle and generates high definition screen data. The screen update notification section 96 notifies the client 12 with the high definition screen data through the communication section 98 and the gateway 16.

The gateway 16 includes a communication section 100, a screen data acquisition section 102, an operation data acquisition section 104, a display screen generation section 116, a frame buffer 118, a update rectangle forming section 120, a update rectangle conversion section 122, and a screen update notification section 124. The gateway 16 also includes a processing load detection section 106, a usable bandwidth estimation section 108, a high frequency screen update region detection section 110, a high frequency screen update region contraction section 112, and a screen data assignment section 114. The communication section 100 performs transmission and reception of data to and from the client 12 and the server 14. The operation data acquisition section 104 acquires operation data received from the client 12, and transmits the acquired data to the server 14. The screen data acquisition section 102 acquires the screen data from the server 14 through the communication section 100. The high frequency screen update region detection section 110 uses acquired screen data to estimate regions where there is extensive update in the screen (referred to below as a high frequency screen update region). The usable bandwidth estimation section 108 uses the network communication state to estimate a utilizable amount of network bandwidth between the gateway 16 and the client 12. The processing load detection section 106 uses load of the CPU 20 of the gateway 16 to detect load data of the gateway 16. The high frequency screen update region contraction section 112 uses data of the usable bandwidth estimation section 108 and the processing load detection section 106 and performs high frequency screen update region contraction or expansion processing. The screen data assignment section 114 uses respective data of the high frequency screen update region and data of the processing load and the usable bandwidth to perform the next assignment. Namely, the screen data assignment section 114 assigns screen data processing routes to a first route of processing by the display screen generation section 116 to the update rectangle conversion section 122, and a second route in which screen data misses out (bypasses) each of the sections 116 to 122. The screen data assignment section 114 assigns screen data of non-processing sessions to the first route when within the high frequency screen update region and to the second route when outside the high frequency screen update region. The display screen generation section 116 decompresses the screen data received from the server 14 in the gateway 16, and writes the data to the frame buffer 118 in the RAM 24. The frame buffer 118 holds the decompressed screen data. The update rectangle forming section 120 periodically checks the frame buffer 118, and generates a changed region as a update rectangle. The update rectangle conversion section 122 compresses the update rectangle and generates high definition screen data. The screen update notification section 124 notifies the high definition screen data to the client 12 through the communication section 100.

The compression processing executed by the update rectangle conversion section 94 of the server 14 is lower compression than the compression processing executed by the update rectangle conversion section 122 of the gateway 16. The compression processing executed by the update rectangle conversion section 94 of the server 14 corresponds to first compression processing of technology disclosed herein, and the compression processing executed by the update rectangle conversion section 122 of the gateway 16 corresponds to second compression processing of technology disclosed herein.

The route of processing by each section of the display screen generation section 116 to the update rectangle conversion section 122 corresponds to a first route of technology disclosed herein. The route that bypasses each of the sections 116 to 122 and proceeds from the screen data assignment section 114 directly to the screen update notification section 124 corresponds to a second route of technology disclosed herein.

Note that the CPU 20 operates as each of the sections 100 to 116, and 120 to 124 in FIG. 4 by executing each of the processes 42 to 64 described above.

Explanation next follows regarding operation of the first exemplary embodiment.

Figure 5:
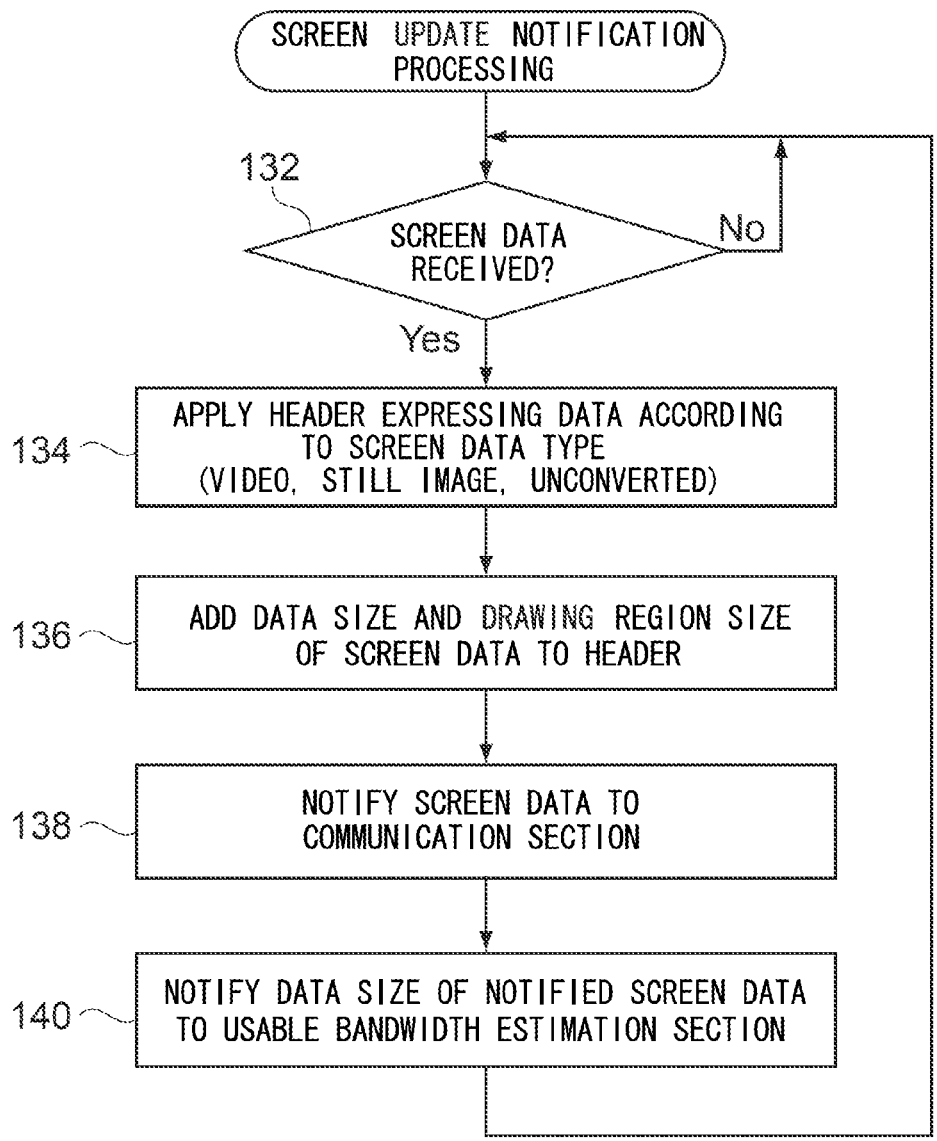
FIG. 5 is a flow chart illustrating screen update notification processing executed by a screen update notification section 124 of the first exemplary embodiment.

FIG. 5 illustrates screen update notification processing executed by the screen update notification section 124 of the gateway 16. A screen update notification processing program is started at a specific timing, and at step 132 the screen update notification section 124 determines whether or not the screen data from the server 14 has been received through the communication section 100. The screen update notification section 124 re-executes the present processing (step 132) when determined that screen data has not yet been received, and proceeds to step 134 when determined that screen data has been received. At step 134, the screen update notification section 124 applies a header expressing data corresponding to the type of received screen data (video, still image, unconverted) to the screen data. At step 136, the screen update notification section 124 adds a data size and a drawing region size (referred to below as w×h) of the screen data to the above header. Note that step 134 and step 136 may be performed in the reverse sequence.

At step 138, the screen update notification section 124 notifies the screen data to the communication section 100, and at step 140 the screen update notification section 124 notifies the data size of the notified screen data to the usable bandwidth estimation section 108, before returning to step 130.

In the first exemplary embodiment, the server 14 compresses the screen data by a first compression processing, and then transmits the compressed screen data to the gateway 16. The screen data is data only including portions of the screen for display that have changed, and this screen data includes data (x, y) representing the position of the changed portion and data of the width (w) and the height (h) of the portion.

Figure 6:
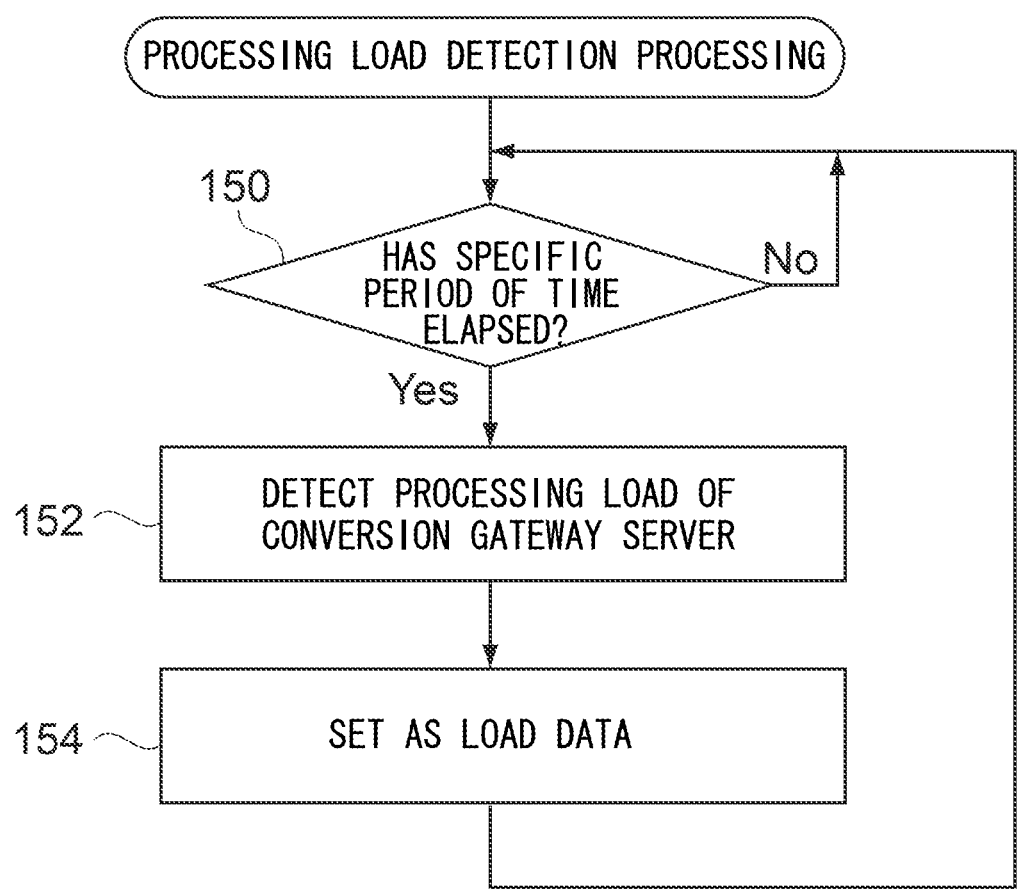
FIG. 6 is a flow chart illustrating processing load detection processing executed by a processing load detection section 106 of the first exemplary embodiment.
Figure 14:
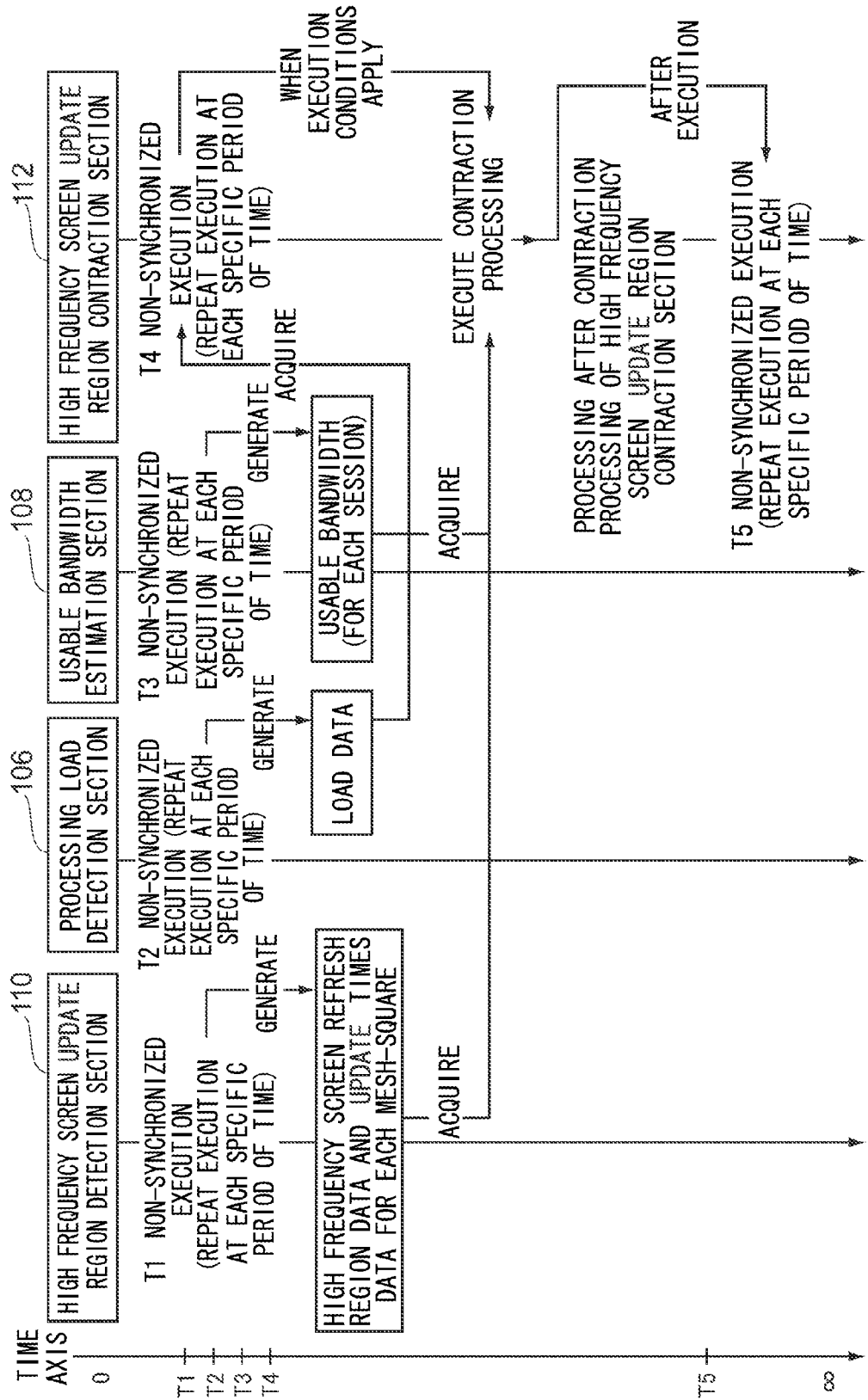
FIG. 14 is a timing chart illustrating processing timings for each section in the first exemplary embodiment.

Processing load detection processing executed by the processing load detection section 106 is illustrated in FIG. 6. The processing load detection processing starts at time T2 (see FIG. 14).

At step 150, the processing load detection section 106 determines whether or not a specific period of time has elapsed. Processing proceeds to step 152 when the processing load detection section 106 has determined that the specific period of time has elapsed. At step 152, the processing load detection section 106 detects the processing load on the gateway 16, and at step 154, the processing load detection section 106 sets this as processing load data, before returning to step 150.

FIG. 7 illustrates usable bandwidth estimation processing that is executed every session by the usable bandwidth estimation section 108. A usable bandwidth estimation processing program is started at time T3 (see FIG. 14). Details will be described later, but briefly, the usable bandwidth is a data volume of screen data that the client 12 at the transmission destination is capable of completing reception processing on within a predetermined period of time. This predetermined period of time is predetermined such that when sequentially displaying a screen based on respective plural sequentially received screen data on a display section, the client 12 executes screen switching within the required period of time. The screen switching is switching between display of a screen based on one screen data to display of a screen based on screen data next received subsequent to the one screen data.

At step 162, the usable bandwidth estimation section 108 receives a screen data receipt reply transmitted from the client 12. The screen data receipt reply here is data expressing how much screen data has arrived at the client 12, and is transmitted by the client 12 each time screen data is received by the client 12. At step 164, the usable bandwidth estimation section 108 acquires data size from the screen update notification section 124 (see step 140 of FIG. 5). Note that step 162 and step 164 may be performed in the reverse sequence.

At step 166, the usable bandwidth estimation section 108 determines whether or not the specific period of time has elapsed, and processing returns to step 162 when determined that the specific period of time has not yet elapsed, where the above processing (steps 162 to 166) is re-executed.

The usable bandwidth estimation processing transitions to step 168 when at step 166 determined that the specific period of time has elapsed. At step 168, the usable bandwidth estimation section 108 sums the size of data notified from the screen update notification section 124 during a specific period of time. At step 170, the usable bandwidth estimation section 108 sets the sum of data sizes calculated at step 168 as the transmission data transfer volume (the data volume for which transmission was attempted). Note that the transmission data transfer volume is employed in verification processing (step 324 of FIG. 15), described in detail later.

At step 172, the usable bandwidth estimation section 108 sums the data size notified in the screen data receipts reply during the specific duration. Note that step 172 may be executed prior to step 168.

At step 174, the usable bandwidth estimation section 108 computes the non-received data size by subtracting the sum of data sizes notified in the screen data receipt replies from the total data size notified from the screen update notification section 124. At step 176, the usable bandwidth estimation section 108 computes a value of the sum of data size notified in the screen data receipt replies divided by an interval of a specific period of time. The value computed at step 176 is a time average value of data volume of screen data arriving at the client 12 from the gateway 16.

At step 178, the usable bandwidth estimation section 108 determines whether or not the non-received data size computed at step 174 is a threshold value or greater. The non-received data being the threshold value or greater has the following technical meaning. Namely, the volume of screen data that the gateway 16 is attempting to transmit to the client 12 in the specific duration is larger by the threshold value or greater than the screen data volume actually capable of being received by the client 12 in the specific duration. Namely, a state exists in which, due to congestion on the line between the client 12 and the gateway 16, the anticipated volume of the screen data from the gateway 16 to the client 12 is not arriving at the gateway 16 side.

Hence, when affirmative determination is made at step 178, the data transfer rate of the currently estimated usable bandwidth is greater than the data volume the client 12 is actually capable of receiving. The time average value computed at step 176 of the data volume of screen data that has arrived at the client 12 is then set as the usable bandwidth.

However, when negative determination is made at step 178, a state exists in which the client 12 is actually capable of receiving the screen data that the gateway 16 is attempting to transmit to the client 12. In such cases, at step 181, the usable bandwidth estimation section 108 makes determination as to whether or not the value computed at step 176 is the currently set usable bandwidth value or greater. The computed value being the current usable bandwidth value or greater has the following technical meaning. Namely, the most recent usable bandwidth value is larger than the set usable bandwidth value, and it is possible to transfer more data. In such cases, at step 183, the usable bandwidth estimation section 108 updates the currently set usable bandwidth value with the value computed at step 176. However, the value computed at step 176 being smaller than the currently set usable bandwidth value has the following technical meaning. Namely, it means that the value computed at step 176 is a value smaller than the value of actually usable bandwidth of the line between the client 12 and the gateway 16. Namely, since there is the possibility that screen data is transferred at a smaller volume than the actual usable bandwidth, a state exists in which a usable bandwidth value indicating the upper limit of the usable bandwidth is not set correctly. In such cases, at step 182, since the usable bandwidth value is not settable, the usable bandwidth estimation section 108 leaves the usable bandwidth value currently set unchanged, and continues in the current state. When these steps have been performed, processing returns to step 162, and the above processing (steps 162 to 182) are re-executed.

FIG. 8 illustrates high frequency screen update detection processing that the high frequency screen update region detection section 110 executes each session.

This processing is started at a specific time T1 (see FIG. 14), and at step 192, the high frequency screen update region detection section 110 determines whether or not new screen data has been received. When determined that new screen data has been received the present processing transitions to step 194.

Figure 9A:
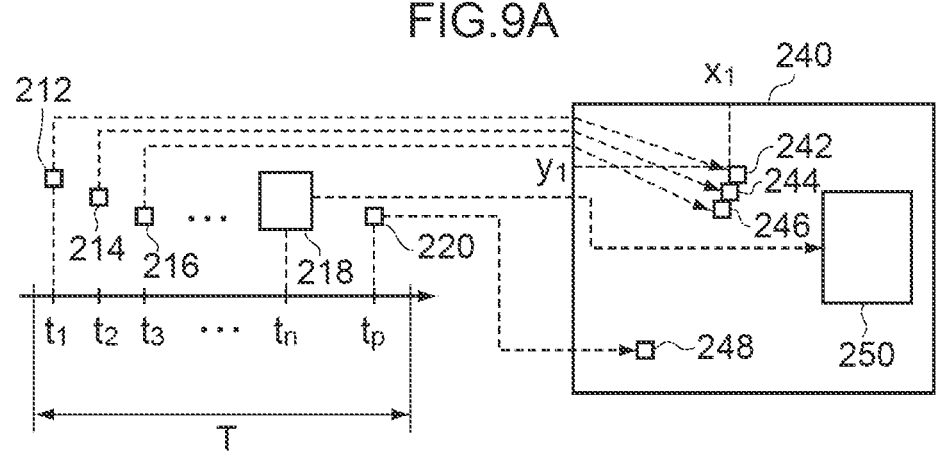
FIG. 9A to FIG. 9E are explanatory diagrams to explain principles of high frequency screen update region detection.

At step 194, the high frequency screen update region detection section 110 extracts update region data. Namely, as described above, data of the position (x, y) of the differing part of the screen is contained in the screen data, and so the high frequency screen update region detection section 110 extracts the update region data from the position (x, y) data. For example, as illustrated in FIG. 9A, data for the position (x1, y1) on a screen 242 is contained in screen data 212 at time t1. The high frequency screen update region detection section 110 extracts this data as the update region data.

Figure 9B:
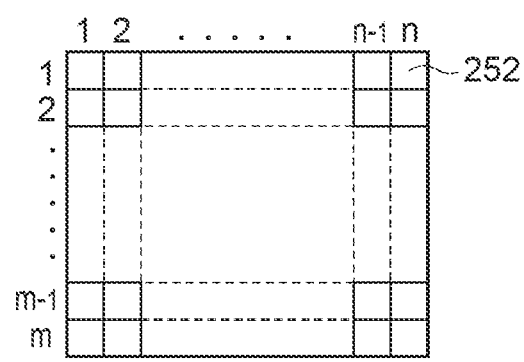

However, the first exemplary embodiment envisages the screen being divided into regions of n×m portions (mesh-squares), as illustrated in FIG. 9B.

At step 196, the high frequency screen update region detection section 110 increases the update count of the mesh-squares overlapping with the update region. Namely, as illustrated in FIG. 9C, a histogram is employed in which each position of the mesh-squares corresponds to the X axis, and the update count of each of the positions corresponds to the Y axis, and the high frequency screen update region detection section 110 executes step 196.

At step 198, the high frequency screen update region detection section 110 determines whether or not a specific period of time has elapsed, with processing returning to step 192 when determined that the specific period of time has not elapsed, and the above processing (steps 192 to 198) re-executed.

Figure 9C:
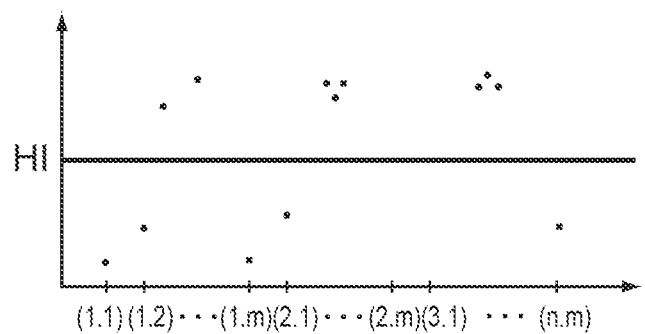
Figure 9D:
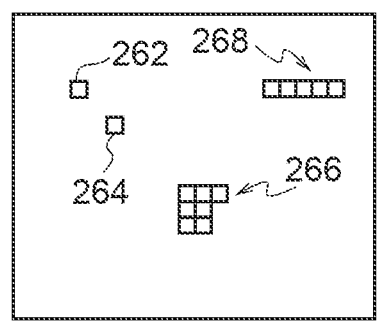

At step 198, when the high frequency screen update region detection section 110 has determined that the specific period of time has elapsed, at step 200 the high frequency screen update region detection section 110 extracts mesh-squares from out of the mesh-squares where the update count value is a threshold value H1 or greater, as illustrated in FIG. 9C. Mesh-squares 262, 264 and plural mesh-square groups 266, 268 are thereby extracted, as illustrated in FIG. 9D. Note that the threshold value H1 corresponds to a frequency threshold value of technology disclosed herein.

Figure 9E:
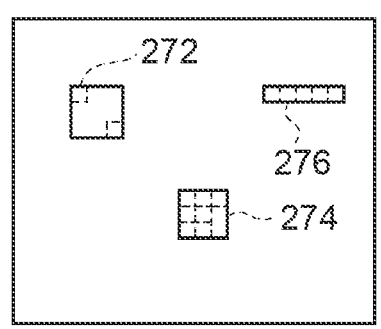

At step 202, in order to simplify calculation processing, the high frequency screen update region detection section 110 performs rectangle forming by combining extracted mesh-squares at a distance apart of a threshold value or lower. Namely, as illustrated in FIG. 9E, a rectangular region 272 is formed from the mesh-squares 262, 264, the rectangular region 274 is formed from the mesh-square group 266, and the rectangular region 276 is formed from the mesh-square group 268. At step 204, the high frequency screen update region detection section 110 sets the formed rectangular regions as the high frequency screen update region.

Figure 10:
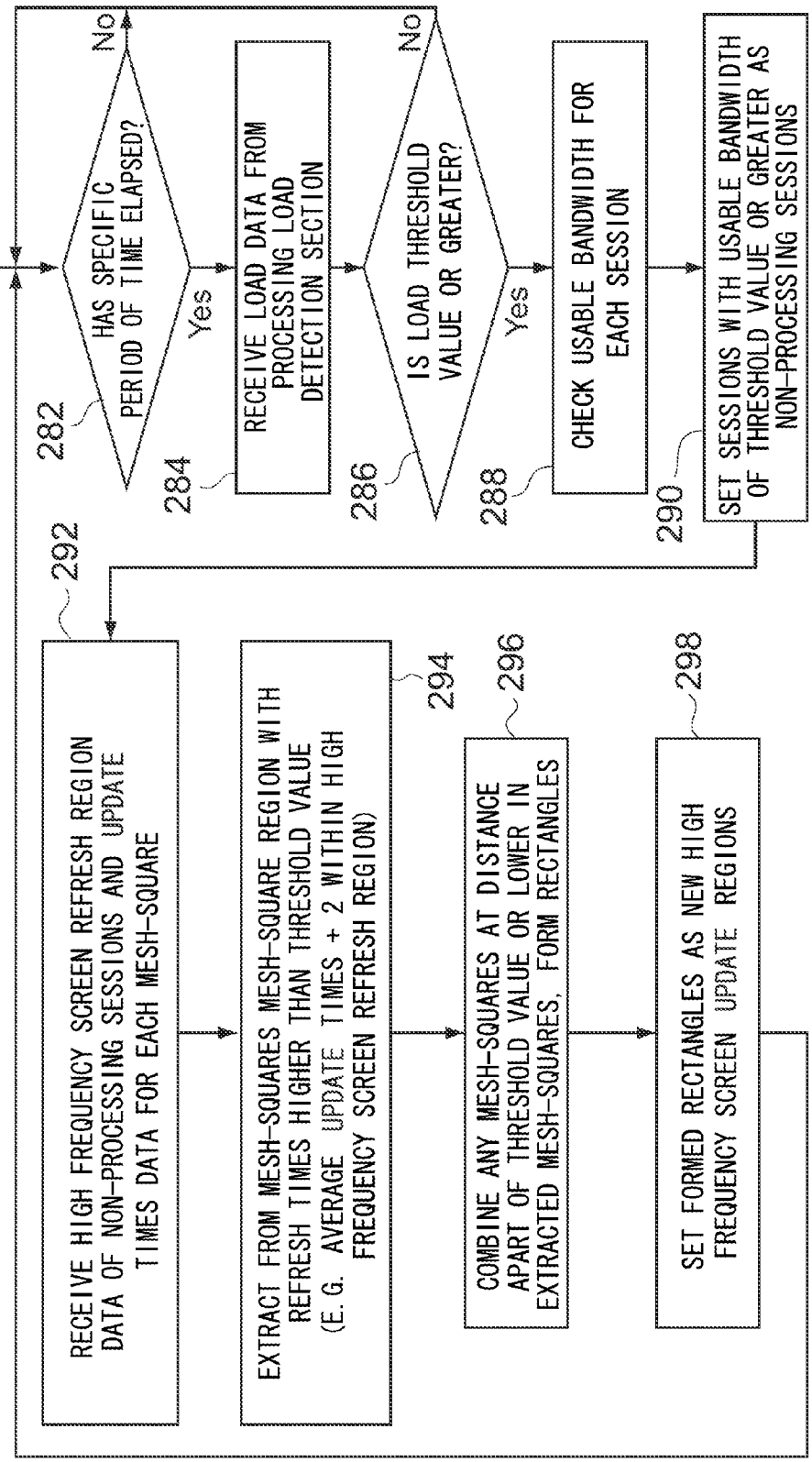
FIG. 10 is a flow chart illustrating high frequency screen update region contraction processing executed by a high frequency screen update region contraction section 112 of the first exemplary embodiment.

As illustrated in FIG. 10, the high frequency screen update region contraction section (referred to below as contraction section) 112 executes a high frequency screen update region contraction processing program every session.

The present processing is started at time T4 (see FIG. 14), and at step 282, the contraction section 112 determines whether or not a specific duration has elapsed, with processing proceeding to step 284 when the specific duration has elapsed.

At step 284, the contraction section 112 receives the load data from the processing load detection section 106, and at step 286 based on the received load data, determines whether or not load is a threshold value (for example 90%) or greater. The threshold value is not limited to 90%, and larger values or smaller values may be employed as the threshold value. Note that the threshold value corresponds to a load threshold value of technology disclosed herein.

The load not being the threshold value or greater indicates a state of the gateway 16 in which load is not so heavy to need to lower the load on the gateway 16. In such cases, processing returns to step 282, and the above processing (steps 282 to 286) is re-executed.

However, the load being the threshold value or greater indicates a state of the gateway 16 in which there is a need for the load on the gateway 16 to be reduced. The following processing is accordingly executed. At step 288, the contraction section 112 checks the usable bandwidth of each session. Note that the usable bandwidth of each session is obtainable from the usable bandwidth estimation processing described above (see FIG. 7), and so this data is checked.

At step 290, the contraction section 112 sets sessions with usable bandwidth of a threshold value (for example 5 Mbps) or greater as non-processing sessions. The non-processing sessions have usable bandwidth of the threshold value or greater and so are sessions in which there is some spare data volume available for transmitting screen data. Note that at step 290 the non-processing sessions are extracted, however unless there are non-processing sessions set, the following contraction processing is not executed even in a state of high load on the gateway 16.

Figure 11A:
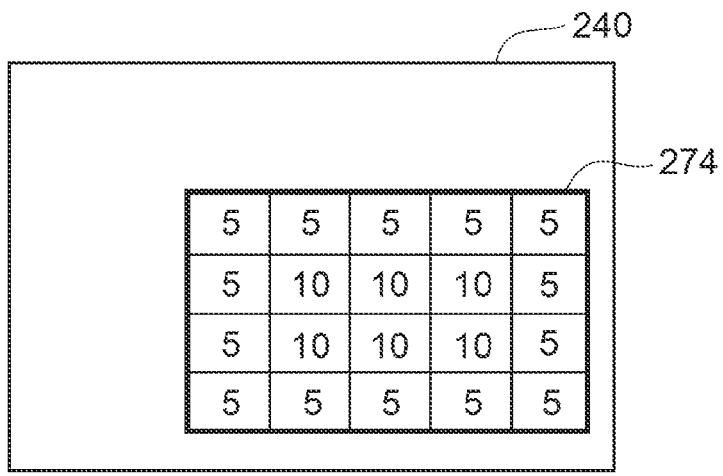
FIG. 11A to FIG. 11C are explanatory diagrams to explain high frequency screen update region contraction processing.

At step 292, for the non-processing sessions, high frequency screen update region data from the high frequency screen update region detection section 110 and update times data for each of the mesh-squares are received. Thereby, for example, as illustrated in FIG. 11A, high frequency screen update region data is received with a update times of the high frequency screen update region, of for example 5, at the periphery thereof, and a update times of 10 inside.

Figure 11B:
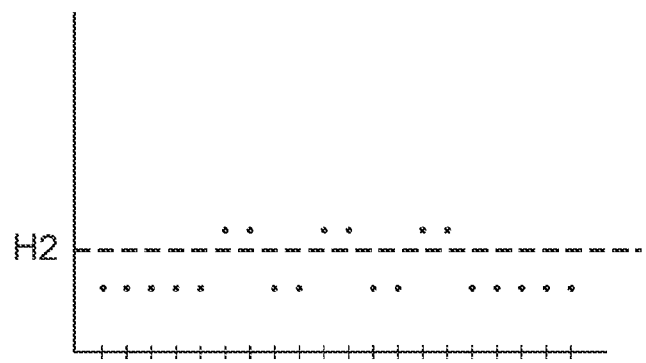
Figure 11C:
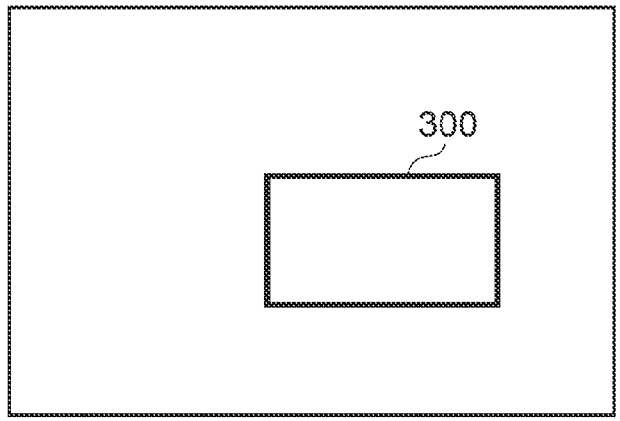

At step 294, the contraction section 112 extracts from the above mesh-squares a mesh-square region where the update times is higher than a threshold value (for example the average update times+2 in the high frequency screen update region). For example, in the example illustrated in FIG. 11A, the update times of each of the mesh-squares is split into mesh-squares of 5 times and mesh-squares of 10 times, as illustrated in FIG. 11B. From this, mesh-squares are extracted larger than a threshold value (the average+2) H2, as illustrated in FIG. 11C, and a region 300 of only mesh-squares of update times 10 is extracted. The threshold value H2 is not limited to the average+2, and larger values or smaller values may be employed for the threshold value H2. Note that the threshold value H2 corresponds to a large frequency threshold value described later.

In order to simplify the calculation processing, at step 296 the contraction section 112 combines extracted mesh-squares at a distance apart of a threshold value or lower, and performs rectangular region forming. Then at step 298, the contraction section 112 sets the formed rectangles as new high frequency screen update regions. After the processing of step 298, the present processing returns to step 282, and the above processing (steps 282 to 298) is re-executed.

Figure 12:
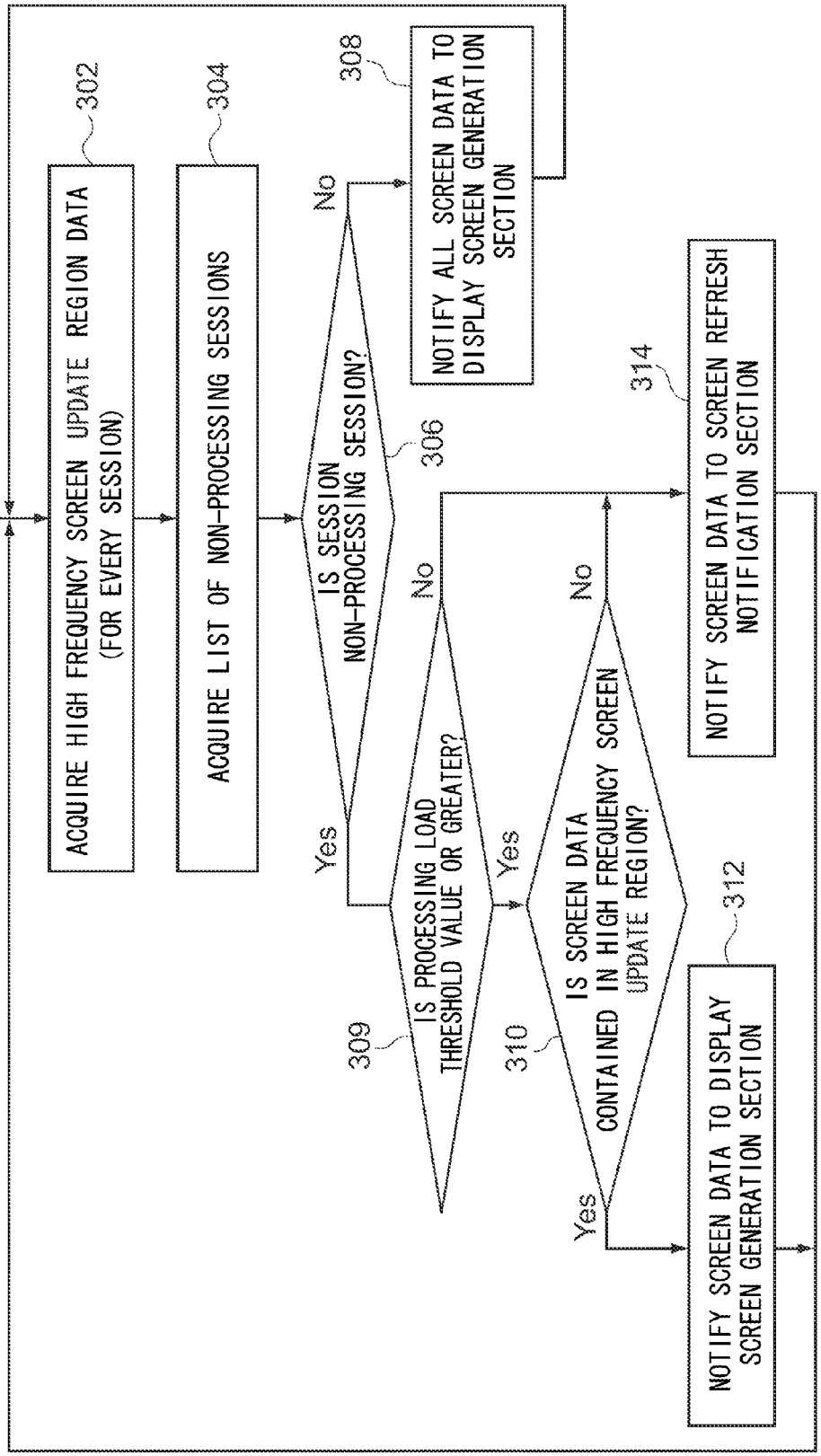
FIG. 12 is a flow chart illustrating screen data assignment processing executed by a screen data assignment section 114 of the first exemplary embodiment.

FIG. 12 illustrates a screen data assignment processing program executed by the screen data assignment section (referred to below as assignment section) 114. In the present processing, starting for each of the above sections (sections 106, 108, 110, 112) is non-synchronized.

Figure 13:
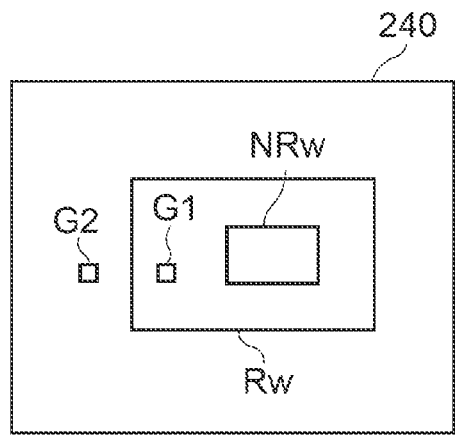
FIG. 13 is an explanatory diagram to explain processing of the first exemplary embodiment, explaining which compression processing is performed depending on the session type and the load of a session.

At step 302, the assignment section 114 acquires data of the high frequency screen update region for every session. As illustrated in FIG. 13, data is acquired for high frequency screen update regions Rw or NRw in a screen 240.

In the above contraction processing (as illustrated in FIG. 10), the above contraction processing is executed for sessions in which the gateway load is the threshold value or greater and the usable bandwidth is a threshold value or greater. The high frequency screen update region NRw contracted to narrower than the high frequency screen update region Rw is accordingly acquired.

At step 304, the assignment section 114 acquires a list of the non-processing sessions (set at the step 290 of FIG. 10).

At step 306, the assignment section 114 selects one session at a time for each of the plural sessions, and determines whether or not the selected session is a non-processing session. Processing transitions to step 308 when the selected session is not a non-processing session. At step 308, the assignment section 114 notifies the display screen generation section 116 with all of the screen data for the selected session. Namely, the processing route for the screen data is assigned to the route that executes compression processing with high compression on this screen data. After step 31 the present processing returns to step 302.

When at step 306 the selected session is determined to be a non-processing session the present processing transitions to step 309. At step 309, the assignment section 114 determines whether or not the processing load detected by the processing load detection section 106 is a threshold value or greater. Note that the threshold value here corresponds to the load threshold value of the technology disclosed herein. When the processing load is not the threshold value or greater, there is no high need to reduce the load on the gateway 16. The present processing then transitions to step 314.

However, there is a need to reduce the load on the gateway 16 when the processing load is the threshold value or greater. Thus at step 310, the assignment section 114 determines whether or not the screen data is contained in a high frequency screen update region. When the screen data is contained in a high frequency screen update region, at step 312, the assignment section 114 notifies the screen data to the display screen generation section 116. Namely, the processing route of the screen data is assigned to the first route.

When the screen data is not contained in a high frequency screen update region, at step 314 the assignment section 114 bypasses the screen data, around each of the above sections (section 116 to section 122), and notifies the screen update notification section 124. Namely, the processing route of the screen data is assigned to the second route in which the above compression processing at high compression is not executed. The condition for selection of the second route is that the following two conditions are satisfied: firstly that the selected session is a non-processing session, and secondly that the load on the gateway 16 is less than the threshold value. The sequence of step 306 and step 309 may be reversed. Namely, when the sequence is reversed, step 308 or step 314 is executed when negative determination is respectively made at step 309 or step 306. Moreover, the present processing transitions to step 310 when affirmative determination is made at both step 309 and step 306.

Cases in which affirmative determination is made at step 310 correspond to cases in which the changed portion in the screen data overlaps with the high frequency screen update region in technology disclosed herein. Cases in which negative determination is made at step 310 correspond to cases in which the changed portion in the screen data does not overlap with the high frequency screen update region in technology disclosed herein.

Note that after step 312 and step 314 have been executed the present processing returns to step 300.

Screen data is processed in the following manner by the above processing (steps 308 to 314). As illustrated in FIG. 13A, the route on which compression processing is executed at high compression is selected for the screen data processing route when the selected session is not a non-processing session. Thus compression processing at high compression is performed on the screen data.

As illustrated in FIG. 13B, the following processing is executed when the selected session is a non-processing session, but the gateway load is not heavy. Namely, the high frequency screen update region Rw of comparatively large surface area is employed as the high frequency screen update region. Then compression processing with high compression is executed when screen data G1 is within the high frequency screen update region Rw of comparatively large surface area. However, when the screen data G is outside of the high frequency screen update region Rw of comparatively large surface area, the screen data is not compressed at the gateway 16, and is instead transmitted to the client 12 as it is in the state compressed by the server 14. Namely, the screen data bypasses the gateway 16. The gateway load is accordingly reduced.

The following processing is executed when, as illustrated in FIG. 13C, the selected session is a non-processing session and the load on the gateway 16 is heavy. Namely, the narrow high frequency screen update region NRw of comparatively small surface area is employed as the high frequency screen update region. Then the compression processing at high compression is not executed by the gateway 16 when the screen data G1 is outside of the high frequency screen update region NRw of comparatively small surface area. Namely, the screen data is transmitted to the client 12 as it is in the state compressed by the server 14. Namely, the screen data bypasses the gateway 16. The gateway load is accordingly reduced.

Figure 15:
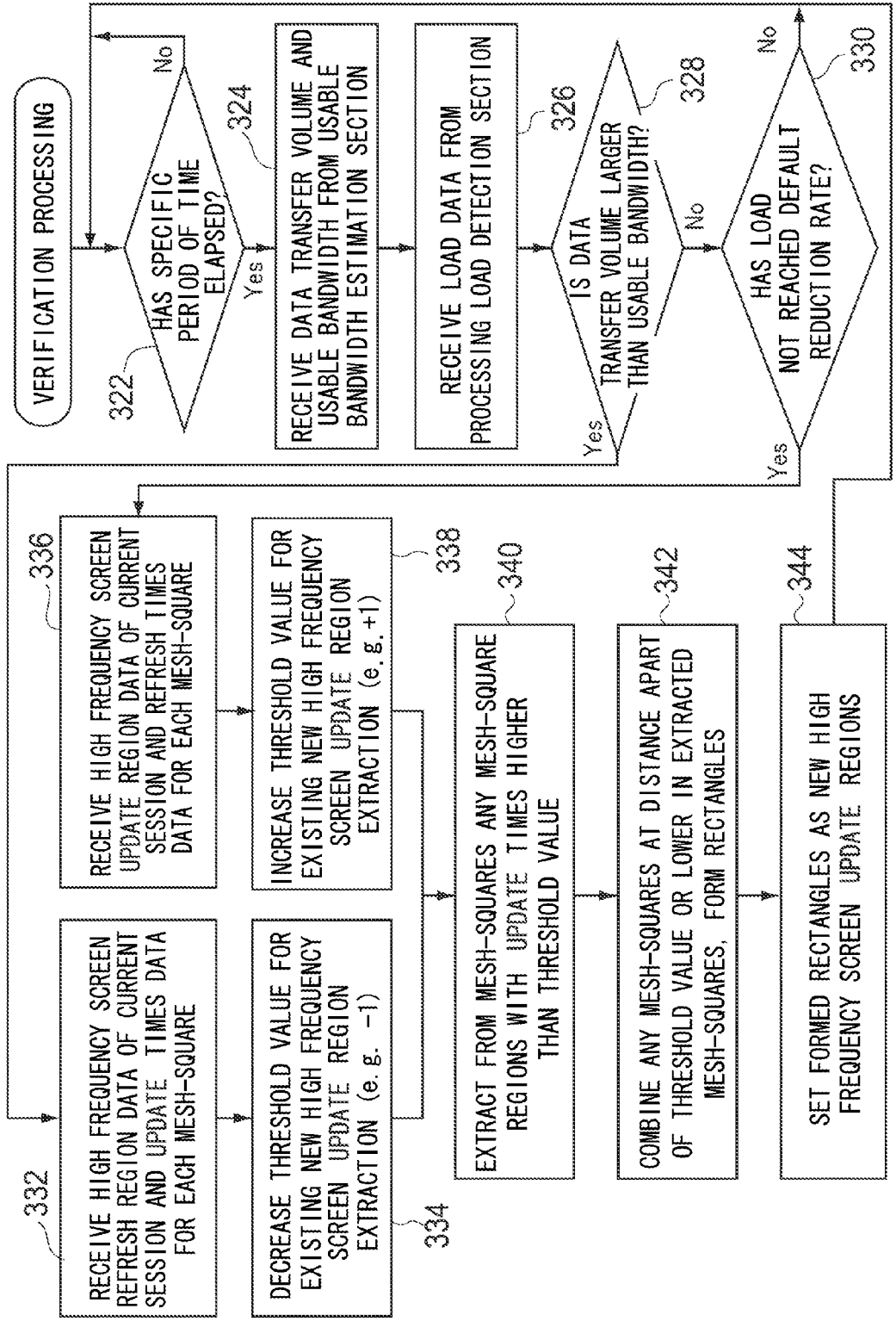
FIG. 15 is a flow chart illustrating verification processing executed by a high frequency screen update region contraction section 112 of the first exemplary embodiment.

FIG. 15 illustrates verification processing executed by the contraction section 112. A verification processing program that implements verification processing is part of the high frequency screen update region contraction processing program. Namely, the verification processing program is, as illustrated in FIG. 4, executed by the contraction section 112 performing the steps illustrated in FIG. 10, and is started at step 282 at time T5 (see FIG. 14) while waiting to see whether or not the specific period of time has elapsed.

At step 322, the contraction section 112 determines whether or not a specific period of time has elapsed that is different to the specific duration at step 282 illustrated in FIG. 10. The present processing proceeds to step 324 when determined that the specific period of time has elapsed.

At step 324, the contraction section 112 receives the data transfer volume (see step 170 in FIG. 7) and the usable bandwidth from the usable bandwidth estimation section 108. At step 326, the contraction section 112 receives the load data from the processing load detection section 106. The sequence of step 324 and step 326 may be reversed.

At step 328, the contraction section 112 determines whether or not the data transfer volume is larger than the usable bandwidth. The data transfer volume being larger than the usable bandwidth means that the following state is present. Namely, a state exists in which the data volume of screen data that the gateway 16 is transmitting to the client 12 is larger than the data volume receivable by the client 12 per specific period of time. Namely, the state exists in which the gateway 16 is transmitting too much. Since the screen data is not compressed at the gateway 16, the data volume the gateway is transmitting is relatively large compared to when compressed at the gateway. This is due to the high frequency screen update region being over-contracted by the contraction section 112. Namely, this is because the region of positions on the screen data that is subject to compression at the gateway 16 is too narrow. There is accordingly a need to enlarge the high frequency screen update region. Thus at step 332, the contraction section 112 receives the high frequency screen update region data for that session and the update times data of each of the mesh-squares. At step 334, the contraction section 112 decreases the existing threshold value for extracting the new high frequency screen update region. For example, the threshold value is reduced by 1. Note that the number by which the threshold value is decreased is not limited to 1, and may be a greater number than 1. Note that the reduced threshold value corresponds to a small frequency threshold value, described later.

Thus when the threshold value (threshold value H1 in FIG. 9C) is reduced, the number of times determination is made that the update times is greater than the threshold value increases even for mesh-squares with fewer update times, in comparison to prior to the threshold value reduction. The high frequency screen update region is accordingly enlarged.

However, the present processing transitions to step 330 when not determined at step 328 that the data transfer volume is larger than the usable bandwidth. At step 330, the contraction section 112 determines whether the load reduction rate on the gateway 16 has not yet reached a default reduction rate (for example 20%). The following state exists when affirmative determination is made at step 330. Namely, the second route bypassing each of the sections 116 to 122 is selected when the position on the screen data is outside the high frequency screen update region. Namely, an attempt is made to reduce the load on the gateway 16 by not performing compression processing at the gateway. However, the reason the load reduction rate has not reached the default reduction rate is because the bypassing second route is not often selected. There is accordingly a need to make selection of the second route easier in order to further reduce the load. There is accordingly a need to make the high frequency screen update region smaller.

At step 336, the contraction section 112 receives the high frequency screen update region data of that session and the update times data for each of the mesh-squares, and at step 338 the contraction section 112 increases the existing threshold value for extracting the new high frequency screen update region. For example, the threshold value is increased by 1. Note that the number by which the threshold value is increased is not limited to 1, and may be a greater number than 1. Note that the increased threshold value corresponds to a large frequency threshold value, described later.

Thus when the threshold value (threshold value H1 of FIG. 9C) is increased, the change times is not determined to be greater than the threshold value other than for mesh-squares with more change times than prior to threshold value increase. The high frequency screen update region is accordingly contracted.

After step 334 or step 338 has been executed, the present processing then transitions to step 340. At step 340, the contraction section 112 extracts from the mesh-squares the mesh-square region for which the number of update times is higher than the threshold value. At step 342 the contraction section 112 combines extracted mesh-squares at a distance apart of a threshold value or lower, and performs rectangle forming. At step 344, the contraction section 112 sets the formed rectangle as the new high frequency screen update region. The above processing (steps 340 to 344) is similar to the processing of steps 294 to 298 of FIG. 10 and so further explanation thereof is omitted. The present processing transitions to step 322 after step 344 has been executed.

Accordingly, due to the verification processing, firstly, when the data transfer volume is larger than the usable bandwidth, the high frequency screen update region is made larger so as to increase the amount of compression processing by the gateway 16, thereby reducing the data transfer volume of screen data. This thereby enables screen data reception processing of the screen data transmitted from the gateway 16 to be completed by the client 12 within the required given durations. Secondly, when the load reduction rate on the gateway has not yet reached the default reduction rate, selection of the bypassing second route is made easier by making the high frequency screen update region narrower, such that the load reduction rate reaches the default reduction rate.

Explanation next follows regarding advantageous effects of the first exemplary embodiment.

In the first exemplary embodiment, screen data outside of the high frequency screen update region bypasses the gateway 16. Namely, the gateway 16 transmits the compressed screen data transmitted from the server 14 to the client 12 in its existing compressed state, without the gateway 16 re-compressing the data itself. The data volume of the screen data transmitted to the client 12 increases in comparison to when the gateway 16 performs re-compression itself of the screen data. However, since re-compression or the like is not required at the gateway 16, the load on the gateway 16 is decreased by that amount. Thus the first exemplary embodiment has the advantageous effect of enabling the load on the gateway 16 to be reduced.

In the first exemplary embodiment, the bypassing described above is employed when the load on the gateway 16 has become high. Thus when there is no need to reduce the load on the gateway 16, the gateway 16 performs its original function of re-compressing data itself. The first exemplary embodiment accordingly has the advantageous effect of enabling the gateway 16 to perform its original function when there is no need to reduce the load on the gateway 16.

Moreover, in the first exemplary embodiment, when the load on itself has become high, the gateway 16 first acquires the load data of the gateway 16 and the usable bandwidth for each of the sessions. Then based on this data the gateway 16 contracts the high frequency screen update region of sessions with large usable bandwidth. Then, as described above, screen data outside of the contracted high frequency screen update region is bypassed. Namely, since the region is enlarged of screen positions in the screen data that are not re-compressed by the gateway 16 itself, there is more screen data that is not re-compressed by the gateway 16 itself than when the region is not enlarged. Thus the first exemplary embodiment exhibits the advantageous effect of enabling the load on the gateway 16 to be reduced compared to when the high frequency screen update region is not contracted.

Thus when the screen data from the server 14 bypasses the gateway 16 as described, the data volume of screen data transmitted to the client 12 increases in comparison to when the gateway 16 re-compresses the screen data itself. However, the gateway 16 performs the above bypassing only when the usable bandwidth is large. Namely, bypassing is only employed for sessions in which the performance of service provision to the client 12 does not fall even when there is a comparatively large data volume for transmission. Thus the first exemplary embodiment exhibits the advantageous effect of enabling the performance of the service provision to the client 12 to be satisfied while also enabling the load on the gateway 16 to be reduced.

In the first exemplary embodiment, verification processing is performed in the following manner.

Namely, first the contraction section 112, after assigning screen data, verifies whether or not the data volume of screen data transmitted to the client 12 is greater than the data volume receivable by the client 12, namely greater than the usable bandwidth. Then, then when the data volume of screen data transmitted to the client 12 is greater than the usable bandwidth, the contraction section 112 enlarges the high frequency screen update region. When the high frequency screen update region has been enlarged, the region of the screen on which the gateway 16 executes high compression is enlarged compared to when the region is not enlarged. The data volume transmitted to the client 12 is accordingly decreased compared to when screen data bypasses without high compression by the gateway 16. The data volume of the screen data transmitted to the client 12 can accordingly be made within the usable bandwidth. The first exemplary embodiment accordingly exhibits the advantageous effect of enabling matching to the data volume receivable by the client 12.

Secondly, the contraction section 112, after screen data assignment has been performed, then verifies whether or not the load reduction rate on the gateway 16 has reached the default reduction rate. Then when the reduction amount of the load on the gateway 16 has not yet reached the predetermined reduction amount, the contraction section 112 contracts the high frequency screen update region. When the high frequency screen update region is contracted, the region of the screen where the gateway 16 re-compresses the screen data is reduced compared to when the high frequency screen update region is not contracted. There are accordingly more times when the screen data is not highly compressed by the gateway 16 than when the high frequency screen update region has not been contracted, thereby enabling the load to be reduced further. The first exemplary embodiment accordingly exhibits the advantageous effect of enabling the reduction rate of load on the gateway 16 to be made the default reduction rate.

Second Exemplary Embodiment

Explanation next follows regarding a second exemplary embodiment of technology disclosed herein.

Figure 16:
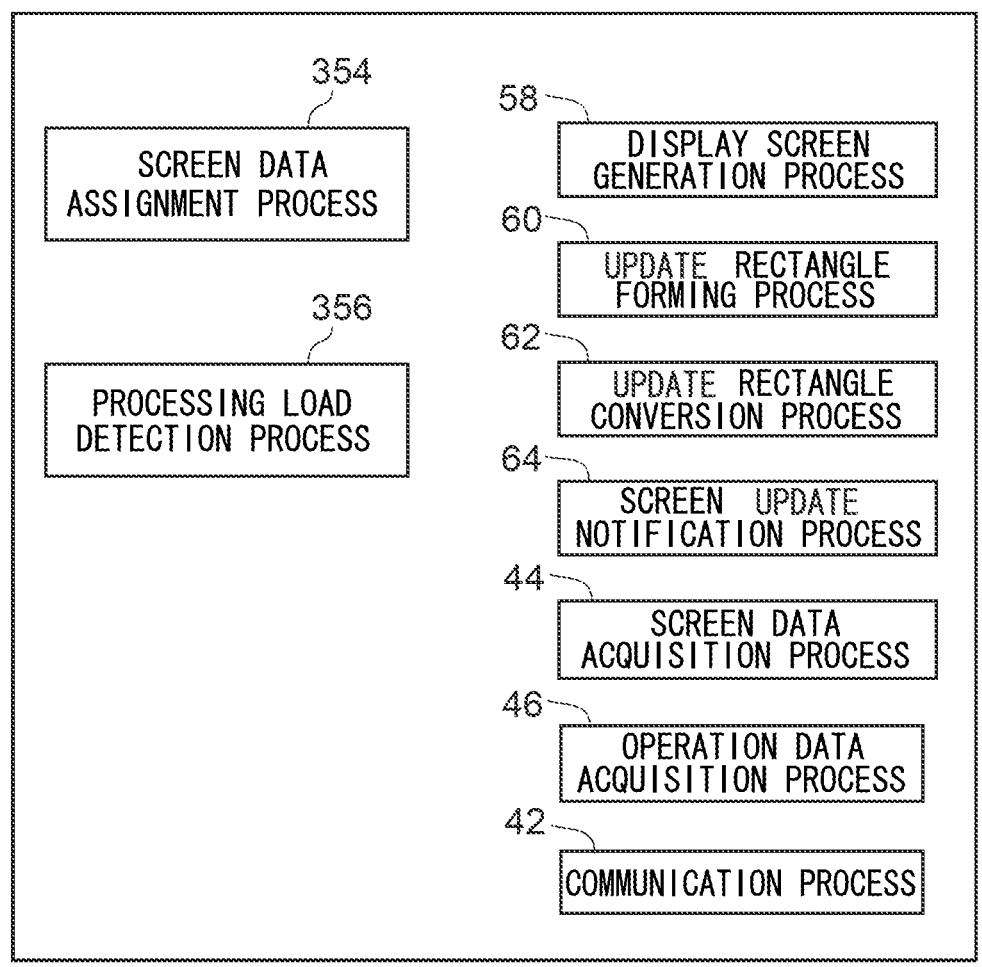
FIG. 16 is a diagram illustrating a configuration of a screen data transmission program of a second exemplary embodiment.

Configuration of the second exemplary embodiment is similar to that of the first exemplary embodiment and so further explanation thereof is omitted. As illustrated in FIG. 16, a screen data transfer program of the second exemplary embodiment is substantially the same as the screen data transfer program of the first exemplary embodiment illustrated in FIG. 3, and so explanation will focus on differing portions. In the screen data transfer program of the second exemplary embodiment, the processing load detection process 48, the usable bandwidth estimation process 50, the high frequency screen update region detection process 52 and the high frequency screen update region contraction process 54 of the first exemplary embodiment illustrated in FIG. 3 are omitted. Other portions are similar to those illustrated in FIG. 3 and so further explanation thereof will be omitted.

Figure 17:
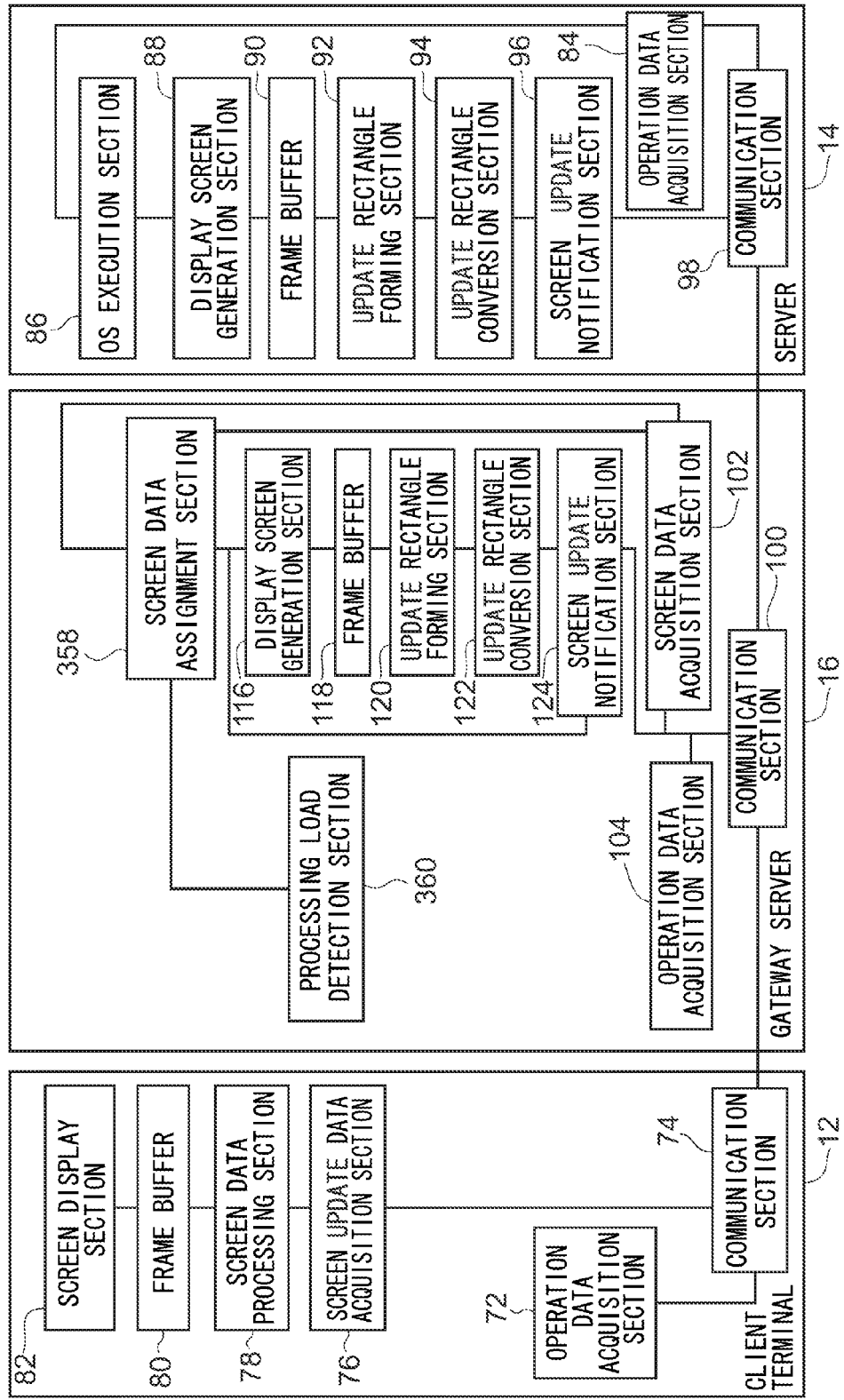
FIG. 17 is a functional block diagram of the second exemplary embodiment.

FIG. 17 is a block diagram illustrating a thin client system of the second exemplary embodiment. As illustrated in FIG. 17, the functional block diagram of the second exemplary embodiment is substantially the same as the functional block diagram of the first exemplary embodiment (see FIG. 4), and so explanation will focus on differing portions. As illustrated in FIG. 17, the functional block diagram of a gateway 16 omits the usable bandwidth estimation section 108, the high frequency screen update region detection section 110, and the high frequency screen update region contraction section 112 of the functional block diagram of the gateway 16 of the first exemplary embodiment. Other portions are similar to those of the first exemplary embodiment and so further explanation is omitted thereof.

The CPU 20 operates as each of the sections 102 to 104, 116, 120 to 124, 354, 356 of FIG. 17 described above by executing each of the processes 42 to 46, 58 to 64, 354, 356 described above.

Explanation next follows regarding operation of the second exemplary embodiment.

A processing load detection section 360 of the second exemplary embodiment executes processing similar to that of the processing load detection section 106 in the first exemplary embodiment, and so further explanation thereof is omitted.

Figure 18:
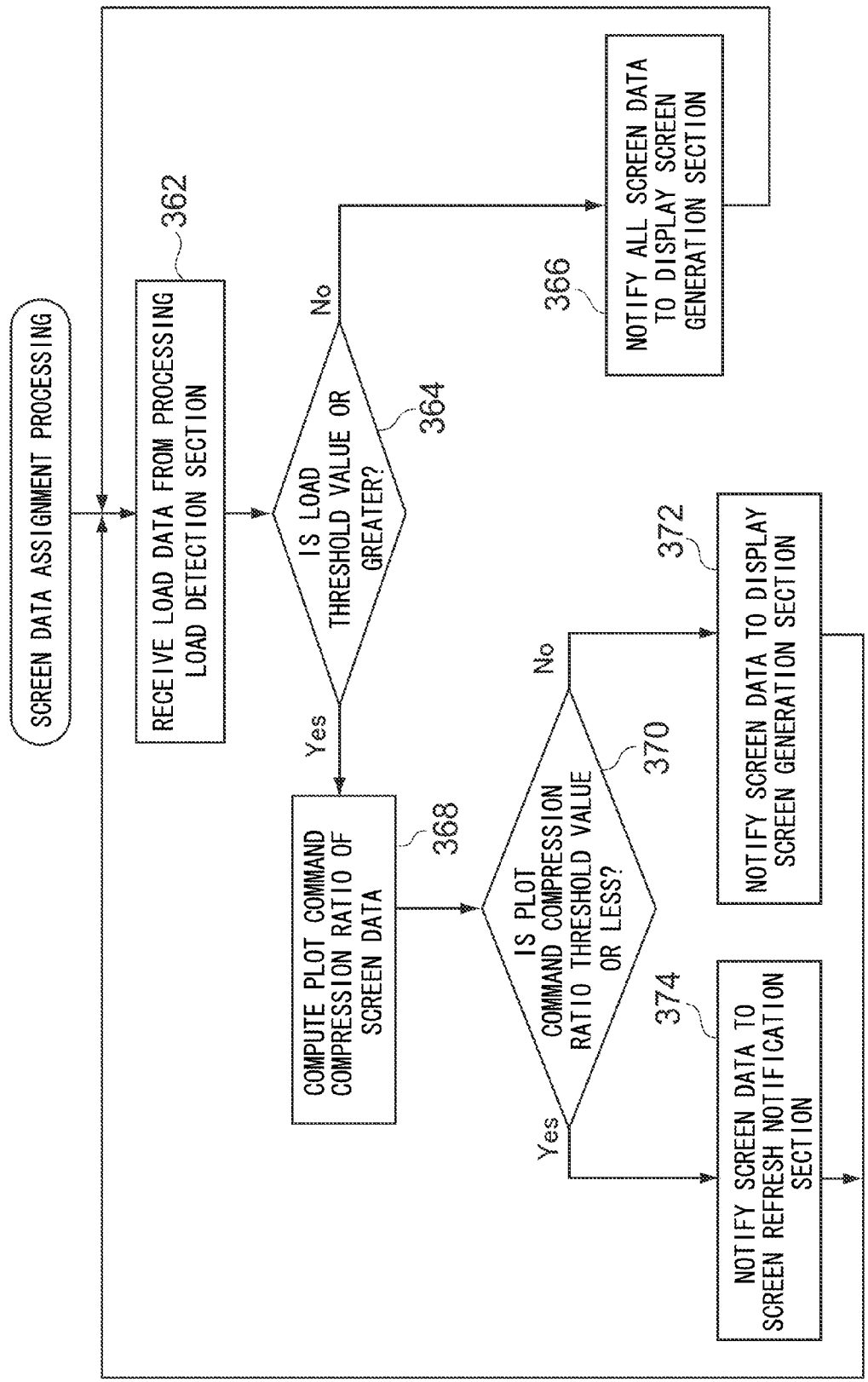
FIG. 18 is a flow chart illustrating screen data assignment processing executed by a screen data assignment section of the second exemplary embodiment.

FIG. 18 illustrates screen data assignment processing of a screen data assignment section (referred to below as assignment section) 358 of the second exemplary embodiment. When the present processing is started, at step 362, the assignment section 358 receives load data from the processing load detection section 360. At step 364 determination is made as to whether or not the load on the gateway 16 is a threshold value (for example 90%) or greater. There is no need to reduce the load on the gateway 16 when the load on the gateway 16 is not the threshold value or greater. At step 366, the assignment section 358 accordingly notifies all of the screen data to a display screen generation section 116.

Then the present processing transitions to step 368 when determined at step 364 that the load on the gateway 16 is the threshold value or greater. At step 368, the assignment section 358 computes the compression ratio of a drawing command of screen data. This compression ratio is a percentage of a value of the data size of the drawing commanded screen data divided by the drawing region size, namely the size (w×h) of the portion drawn based on the screen data.

At step 370, the assignment section 358 determines whether or not the compression ratio of the drawing command is a threshold value (for example 30%) or lower.

The drawing command compression ratio not being the threshold value or lower means a state exists in which the screen data is not compressed much in the server 14. Namely, there is a need for further compression when transmitting to the client 12. Thus at step 372, the assignment section 358 selects the first route, and notifies the screen data to the display screen generation section 116.

However, the compression ratio of the drawing command being the threshold value or lower means a state exists in which the screen data has been compressed a lot in the server 14. There are accordingly few issues with transferring the screen data as it is to the client 12. In order to reduce the load on the gateway 16 there is accordingly a need to execute the bypassing described above. Thus at step 374, the assignment section 358 selects the second route and notifies the screen data to the screen update notification section 124. Processing transitions to step 362 after step 372 and step 374 have been executed.

Explanation next follows regarding advantageous effects of the second exemplary embodiment.

In the second exemplary embodiment, the gateway 16 performs high compression processing when the drawing command compression ratio of the screen data is greater than the threshold value. However, when the drawing command compression ratio is the threshold value or lower, the assignment section 114 employs the bypassing described above to reduce the load on the gateway 16. Thus in the second exemplary embodiment, the assignment section 114 assigns the screen data processing route to the first route or the second route based on the drawing command compression ratio. The screen data is accordingly bypassed by the assignment section 114 even when positioned within the above high frequency screen update region. Thus the second exemplary embodiment exhibits the advantageous effect of enabling the load on the gateway to be reduced even when the screen data is positioned within the above high frequency screen update region.

Note that although the steps 362 to 366 are executed in the second exemplary embodiment, they may be omitted. In such cases, the load on the gateway 16 is reduced when affirmative determination is made at step 370 and step 374 is executed.

Third Exemplary Embodiment

Explanation next follows regarding a third exemplary embodiment of technology disclosed herein.

The configuration of the third exemplary embodiment is similar to that of the second exemplary embodiment and so further explanation thereof is omitted.

Figure 19:
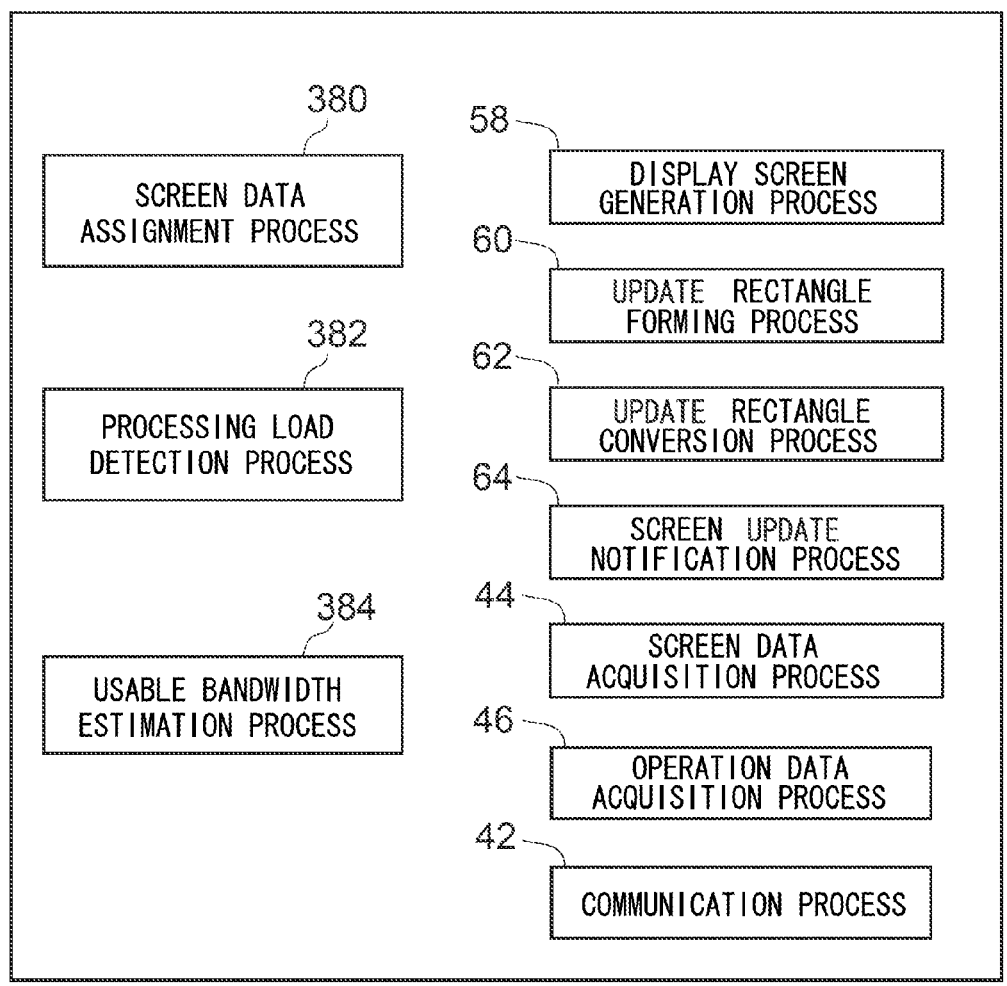
FIG. 19 is a diagram illustrating a configuration of a screen data transmission program of a third exemplary embodiment.

FIG. 19 illustrates a screen data transfer program of the third exemplary embodiment. As illustrated in FIG. 19, explanation of portions of the screen data transfer program of the third exemplary embodiment similar to those of the screen data transfer program of the second exemplary embodiment in FIG. 16 is omitted, with explanation focusing on differing portions. Namely, as illustrated in FIG. 19, the screen data transfer program of the third exemplary embodiment differs from the second exemplary embodiment (see FIG. 16) in that a processing load detection process 382 is further included.

Figure 20:
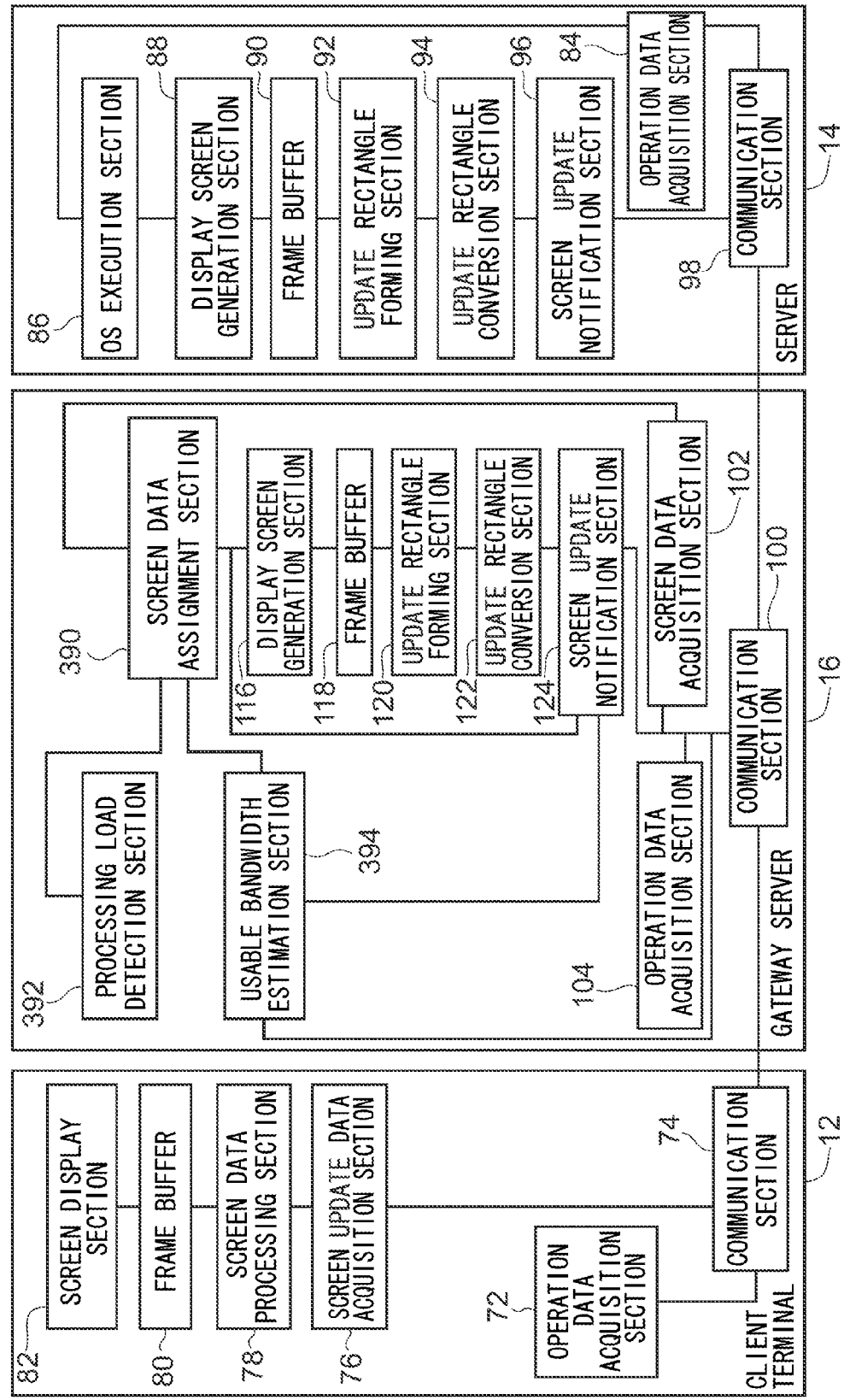
FIG. 20 is a functional block diagram of the third exemplary embodiment.

FIG. 20 illustrates a functional block diagram of the thin client system of the third exemplary embodiment. The functional block diagram of the third exemplary embodiment is configured similarly to the functional block diagram of the thin client system in the second exemplary embodiment, and so explanation is only given regarding differing portions. As illustrated in FIG. 20, the functional block diagram of the gateway 16 of the third exemplary embodiment differs from that of the second exemplary embodiment (see FIG. 17) in that a usable bandwidth estimation section 394 is provided.

The CPU 20 operates as each of the sections 102 to 104, 116, 120 to 124, 390, 392, 394 of FIG. 20 by executing each of the processes 42 to 46, 58 to 64, 380 to 384 described above.

Explanation next follows regarding operation of the third exemplary embodiment.

The processing load detection section 392 of the third exemplary embodiment executes processing similar to that of the processing load detection section 106 of the first exemplary embodiment, and so explanation thereof is omitted. The usable bandwidth estimation section 394 of the third exemplary embodiment executes processing similar to that of the usable bandwidth estimation section 108 of the first exemplary embodiment, and so explanation thereof is omitted.

Figure 21:
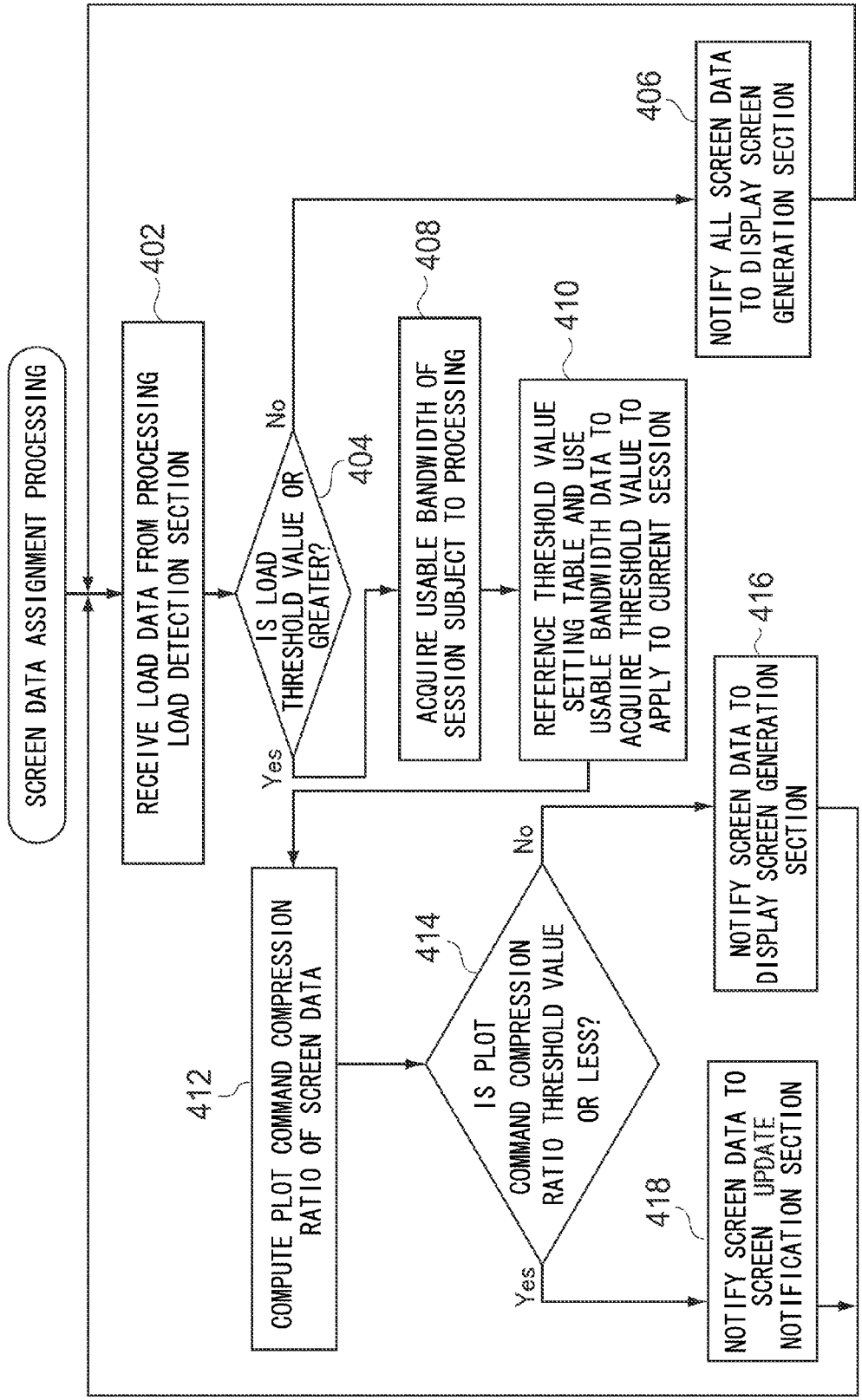
FIG. 21 is a flow chart illustrating screen data assignment processing executed by a screen data assignment section of the third exemplary embodiment.
Figure 23:
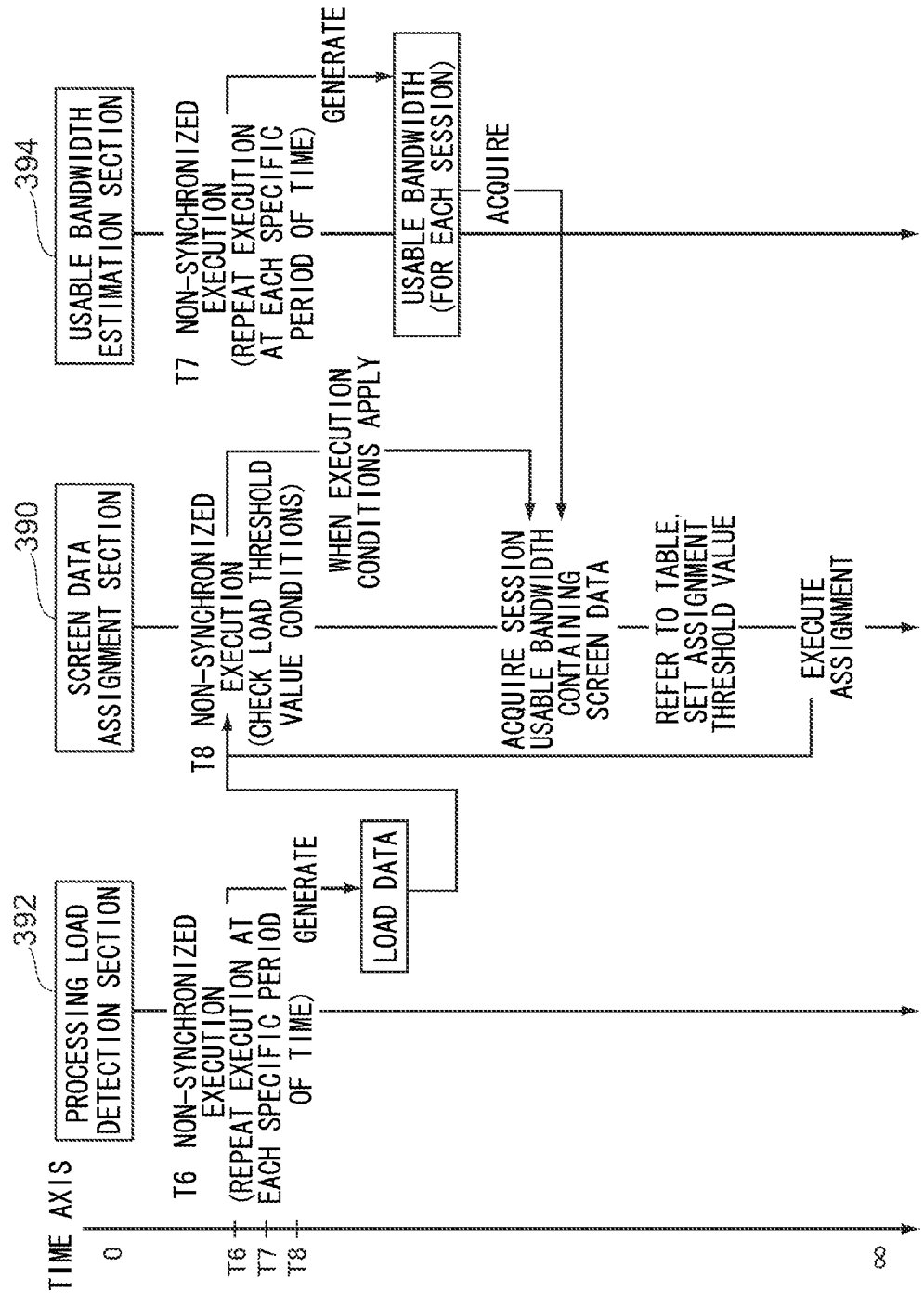
FIG. 23 is a timing chart illustrating processing timings for each section in the third exemplary embodiment.
Figure 24:
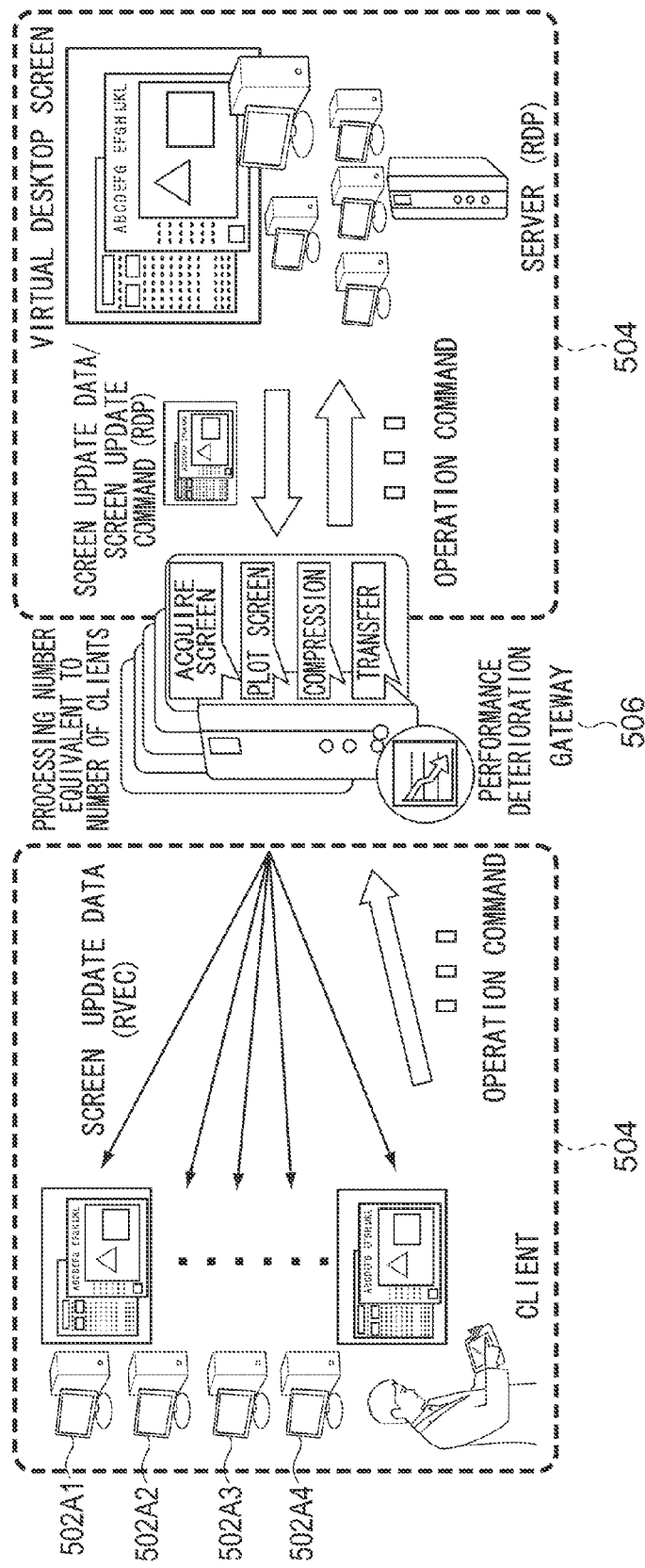
FIG. 24 is an explanatory diagram to schematically explain processing of a thin client system of related technology.

FIG. 21 illustrates screen data assignment processing executed by an assignment section 390 of the third exemplary embodiment every session. The screen data assignment processing is, as illustrated in FIG. 23, started at a time T8 that is different to the processing load detection processing start time T6, and different to the usable bandwidth estimation processing start time T7. When the present processing is started, the load data is received from the processing load detection section 392. At step 404, determination is made as to whether or not the load on the gateway 16 is a threshold value (for example 90%) or greater. There is no need to reduce the load on the gateway 16 when the load on the gateway 16 is not the threshold value or greater. Thus at step 406, the assignment section 390 notifies all the screen data for the current session to the display screen generation section 116, and then transitions to the processing of step 402.

At step 404, when determined that the load is the threshold value or greater, the present processing transitions to step 408. Then at step 408, the usable bandwidth of the session subject to processing is acquired from the usable bandwidth estimation section 394. At step 410, the assignment section 390 refers to a threshold value setting table 420 (see FIG. 22), and uses the data of the acquired usable bandwidth at step 408 to acquire the threshold value to apply to the current session. For example, when the acquired usable bandwidth is 0.5 Mbps, 30% is acquired as the threshold value. Moreover, in a separate session, when the usable bandwidth is 8 Mbps, 60% is acquired as the threshold value.

Consequently, the threshold value is made higher as the usable bandwidth gets larger for the following reason. When the usable bandwidth becomes larger, the data transfer volume of the screen data capable of being transferred from the gateway 16 to the client 12 becomes greater. In such cases, even without so much compression, there are no significant issues arising when the screen data is transmitted to the client 12 as it is in a state compressed by the server 14. Namely, as the usable bandwidth increases, the second route becomes more readily selected as the processing route for the screen data by making the threshold value greater. This thereby enables the load on the gateway to be reduced. Thus at step 410, a threshold value set in this manner is employed as the threshold value to apply to the current session.

At step 412, the assignment section 390 computes the compression ratio of the drawing command of the screen data. At step 414, the assignment section 390 determines whether or not the drawing command compression ratio is the threshold value acquired at step 410 or less. When the compression ratio is greater than the threshold value, at step 416 the assignment section 390 notifies the screen data to the display screen generation section 116. Namely, the processing route of the screen data is assigned to the first route. However, when the drawing command compression ratio is the threshold value or lower, at step 418 the assignment section 390 notifies the screen data to the screen update notification section 124. Namely, the processing route of the screen data is assigned to the second route. Processing transitions to step 402 when step 416 and step 418 have been executed.

Explanation next follows regarding advantageous effects of the third exemplary embodiment.

In the third exemplary embodiment, the threshold value of the drawing command compression ratio is made larger as the usable bandwidth gets greater. Thus bypassing of the compression processing of the gateway 16 becomes easier as the usable bandwidth increases. Thus the third exemplary embodiment exhibits the advantageous effect of enabling the load of the gateway to be reduced.

Not that although in the third exemplary embodiment the steps 402 to 406 are executed, these may be omitted. In such cases, the load on the gateway 16 is reduced when affirmative determination is made at step 414, and step 418 is executed.

Note that in the first exemplary embodiment to the third exemplary embodiment, explanation has been given of technology disclosed herein with respect to the example of a thin client system. However the technology disclosed herein may be applied to other examples than a thin client system.

An aspect of an exemplary embodiment exhibits the advantageous effect of enabling the load to a screen data transfer device to be reduced.

All cited documents, patent applications and technical standards mentioned in the present specification are incorporated by reference in the present specification to the same extent as if the individual cited documents, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A screen data transfer device comprising:
a processor; and
a memory storing instructions, which when executed by the processor perform a procedure, the procedure including:
  (a) receiving screen data that contains position data indicating a position to display on a screen and in which portions that have changed within the screen as a whole have been compressed by first compression processing, and, based on the position data of a plurality of the screen data received within a specific duration by a communication section that transmits screen data, detecting a high frequency screen update region where a changed frequency in the screen is a frequency threshold value or greater;
  (b) detecting a processing load of the screen data transfer device itself; and (c) in cases in which the processing load detected in (b) is a load threshold value or greater, and based on the position data of the screen data received after the specific duration, the changed portion in the screen data overlaps with the high frequency screen update region, assigning a processing route for the screen data to a first route in which second compression processing with a higher compression ratio to that of the first compression processing is executed by a compression section and the screen data on which the second compression processing has been executed is transmitted by the communication section, and in cases in which the processing load detected in (b) is a load threshold value or greater, and based on the position data of the screen data received after the specific duration, the changed portion in the screen data does not overlap with the high frequency screen update region, assigning the processing route for the screen data to a second route in which the screen data bypasses the compression section and is transmitted by the communication section.

2. The screen data transfer device of claim 1, wherein:
the procedure further includes (d) estimating a usable bandwidth that is a data volume of the screen data on which a transmission destination is capable of completing reception processing within a predetermined duration, and
in (c), determining whether or not the usable bandwidth estimated in (d) is a bandwidth threshold value or greater, and assigning the processing route of the screen data in a case in which it is determined that the usable bandwidth is the bandwidth threshold value or greater.

3. The screen data transfer device of claim 2, wherein:
the predetermined duration is a predetermined duration such that, when screens are displayed in sequence on a display section respectively based on a plurality of the screen data received in sequence, the transmission destination is able to switch within a required period of time between screen display based on one screen data and screen display based on the next received screen data after the one screen data.

4. The screen data transfer device of claim 1, wherein:
the procedure further includes (d) estimating a usable bandwidth that is a data volume of screen data on which a transmission destination is capable of completing reception processing within a predetermined duration,
(e) contracting the high frequency screen update region when the processing load detected at (b) is a load threshold value or greater, and the usable bandwidth estimated at (d) is the bandwidth threshold value or greater, and using, as the high frequency screen update region in (c), the region that was contracted in (e).

5. The screen data transfer device of claim 4, wherein:
in (e) contracting the high frequency screen update region to a contracted region where a frequency changed in the detected high frequency screen update region is a large frequency threshold value that is greater than the frequency threshold value, or greater.

6. The screen data transfer device of claim 4, wherein:
in (e), after the assignment has been performed at (c), enlarging the high frequency screen update region when a data volume of the screen data to be transmitted by the communication section is larger than the usable bandwidth.

7. The screen data transfer device of claim 4, wherein:
in (e), the high frequency screen update region is expanded to an expanded region where a changed frequency in the detected high frequency screen update region is a small threshold value that is smaller than the frequency threshold value, or greater.

8. The screen data transfer device of claim 7, wherein:
the screen is split in advance into a plurality of regions, and
in (e), the change times of each of the plurality of regions in the detected high frequency screen update region is calculated, and a region where the calculated change times is the small threshold value or greater is taken as the expanded region.

9. The screen data transfer device of claim 7, wherein:
at (e), when a plurality of the expanded regions are detected, a rectangular region is formed to include the plurality of expanded regions, and the formed rectangular region is taken as the high frequency screen update region.

10. The screen data transfer device of claim 4, wherein:
at (e), after the assignment of (c) has been performed, the high frequency screen update region is contracted when the reduced amount of processing load detected at (b) has not reached a predetermined reduction amount.

11. The screen data transfer device of claim 10, wherein:
at (e), the high frequency screen update region is contracted to a contracted region where a changed frequency in the high frequency screen update region detected at (a) is a large frequency threshold value that is larger than the frequency threshold value, or greater.

12. The screen data transfer device of claim 11, wherein:
the screen is split in advance into a plurality of regions, and
in (e), the change times of each of the plurality of regions in the high frequency screen update region detected at (a) is calculated, and a region where the calculated change times is the large threshold value or greater is taken as the contracted region.

13. The screen data transfer device of claim 11, wherein:
in (e), when a plurality of the contracted regions are detected, a rectangular region is formed to include the plurality of contracted regions and the formed rectangular region is taken as the high frequency screen update region.

14. The screen data transfer device of claim 1, wherein:
the screen is split in advance into a plurality of regions, and
in (a), based on the position data of a plurality of the screen data received within a specific duration by the communication section, the change times corresponding to the plurality of the screen data is calculated for each of the plurality of regions, and the high frequency screen update region is detected by detecting a region where the calculated change times is the frequency threshold value or greater.

15. A screen data transfer device comprising:
a processor; and
a memory storing instructions, which when executed by the processor perform a procedure, the procedure including:
(a) receiving screen data in which portions that have changed within the screen as a whole have been compressed by first compression processing, and, in cases in which a compression ratio, by which screen data is compressed by the first compression processing in the screen data received by a communication section that transmits screen data, is not a predetermined compression ratio or lower, assigning a processing route for the screen data to a first route in which second compression processing with a higher compression ratio to that of the first compression processing is executed by a compression section and the screen data on which the second compression processing has been executed is transmitted by the communication section, and in cases in which the compression ratio by which screen data is compressed is the predetermined compression ratio or lower, assigning the processing route for the screen data to a second route in which the screen data bypasses the compression section and is transmitted by the communication section.

16. The screen data transfer device of claim 15, wherein:
the procedure further includes (b) detecting a processing load of the screen data transfer device, and
in (a), assigning the screen data when the processing load is a load threshold value or greater.

17. The screen data transfer device of claim 15, wherein:
the screen data contains data indicating a size of the received screen data and data indicating the size of the changed portion corresponding to the screen data, and
the compression ratio is computed based on the size of the screen data and the size of the changed portion.

18. The screen data transfer device of claim 15, wherein:
the procedure further includes (c) estimating a usable bandwidth that is a data volume of screen data on which a transmission destination is capable of completing reception processing within a predetermined duration, and
in (a), assigning the processing route to the second route as the usable bandwidth gets larger.

19. The screen data transfer device of claim 18, wherein
a given plurality of compression ratio threshold values are predetermined such that the processing route is assigned to the second route as the usable bandwidth gets larger, and
in (a), selecting from the plurality of compression ratio threshold values a compression ratio threshold value corresponding to the usable bandwidth based on the estimated usable bandwidth, and assigning the processing route of the screen data using the selected compression ratio threshold value as the predetermined compression ratio.

20. A processing load reduction method comprising:
(a) by a processor, receiving screen data that contains position data indicating a position to display on a screen and in which portions that have changed within the screen as a whole have been compressed by first compression processing, and, based on the position data of a plurality of the screen data received within a specific duration by a communication section that transmits screen data, detecting a high frequency screen update region where a changed frequency in the screen is a frequency threshold value or greater;
(b) by the processor, detecting a processing load of a device itself; and
(c) by the processor, in cases in which the processing load detected in (b) is a load threshold value or greater, and based on the position data of the screen data received after the specific duration, the changed portion in the screen data overlaps with the high frequency screen update region, assigning a processing route for the screen data to a first route in which second compression processing with a higher compression ratio to that of the first compression processing is executed by a compression section and the screen data on which the second compression processing has been executed is transmitted by the communication section, and in cases in which the processing load detected in (b) is a load threshold value or greater, and based on the position data of the screen data received after the specific duration, the changed portion in the screen data does not overlap with the high frequency screen update region, assigning the processing route for the screen data to a second route in which the screen data bypasses the compression section and is transmitted by the communication section.

* * * * *